US008473436B2

(12) United States Patent
Moore et al.

(10) Patent No.: US 8,473,436 B2
(45) Date of Patent: Jun. 25, 2013

(54) NEURAL SEGMENTATION OF AN INPUT SIGNAL AND APPLICATIONS USING SIMULATED NEURONS, AND A PHASE MODULATOR

(75) Inventors: Douglas A. Moore, San Diego, CA (US); Kristi H. Tsukida, San Diego, CA (US); Paulo B. Ang, Antioch, CA (US)

(73) Assignee: The Intellisis Corporation, San Diego, CA (US)

( * ) Notice: Subject to any disclaimer, the term of this patent is extended or adjusted under 35 U.S.C. 154(b) by 889 days.

(21) Appl. No.: 12/621,243

(22) Filed: Nov. 18, 2009

(65) Prior Publication Data

US 2011/0119057 A1    May 19, 2011

(51) Int. Cl.
*G06E 1/00* (2006.01)
(52) U.S. Cl.
USPC .............................................. 706/15
(58) Field of Classification Search
USPC ................... 706/15–16, 45, 62; 703/1
See application file for complete search history.

(56) References Cited

U.S. PATENT DOCUMENTS

| | | | |
|---|---|---|---|
| 5,132,813 A * | 7/1992 | Caulfield et al. | 359/11 |
| 5,293,456 A | 3/1994 | Guez et al. | |
| 5,355,435 A * | 10/1994 | DeYong et al. | 706/26 |
| 5,666,518 A | 9/1997 | Jumper | |
| 6,256,032 B1 | 7/2001 | Hugh | |
| 7,467,115 B2 | 12/2008 | Edelman et al. | |
| 7,519,452 B2 | 4/2009 | Seth et al. | |
| 2007/0100780 A1 | 5/2007 | Fleischer et al. | |
| 2007/0129648 A1 * | 6/2007 | Etienne-Cummings et al. | 600/557 |
| 2007/0285040 A1 * | 12/2007 | Jenner, Jr. | 318/568.1 |
| 2009/0089229 A1 | 4/2009 | Edelman et al. | |

OTHER PUBLICATIONS

"Brain-Based Devices: Intelligent Systems Based on Principles of the Nervous System" Krichmar et al., Proceedings of the 2003 IEEE/RSJ, Intl. Conference on Intelligent Robots and Systems, pp. 940-945, Las Vegas, Nevada, Oct. 2003.
"A Neurally Controlled Robot Competes and Cooperates with Humans in Segway Soccer", Fleischer et al., Proceedings of the 2006 IEEE, International Conference on Robotics and Automation, Orlando, Florida, May 2006, pp. 3673-3678.
"Visual Binding Through Reentrant Connectivity and Dynamic Synchronization in a Brain-based Device", Seth et al., Cerebral Cortex V14 N11, Nov. 2004, pp. 1185-1199.

(Continued)

*Primary Examiner* — David Vincent
(74) *Attorney, Agent, or Firm* — Pillsbury Winthrop Shaw Pittman LLP

(57) ABSTRACT

Disclosed are systems, methods, and computer-program products for segmenting content of an input signal and applications thereof. In an embodiment, the system includes simulated neurons, a phase modulator, and an entity-identifier module. Each simulated neuron is connected to one or more other simulated neurons and is associated with an activity and a phase. The activity and the phase of each simulated neuron is set based on the activity and the phase of the one or more other simulated neurons connected to each simulated neuron. The phase modulator includes individual modulators, each configured to modulate the activity and the phase of each of the plurality of simulated neurons based on a modulation function. The entity-identifier module is configured to identify one or more distinct entities (e.g., objects, sound sources, etc.) included in the input signal based on the one or more distinct collections of simulated neurons that have substantially distinct phases.

21 Claims, 28 Drawing Sheets

OTHER PUBLICATIONS

"Binocular Stereo Vision Processing Based on Pulse Coupled Neural Networks", Y. Ogawa et al., SICE Annual Conference in Sapporo, Aug. 4-6, 2004, pp. 311-316, Japan.

"Texture Discrimination by an Autonomous Mobile Brain-Based Device with Whiskers", Seth et al., Proceedings of the 2004 IEEE, International Conference on Robotics and Automation, Apr. 2004, pp. 4925-4930, New Orleans, LA.

* cited by examiner

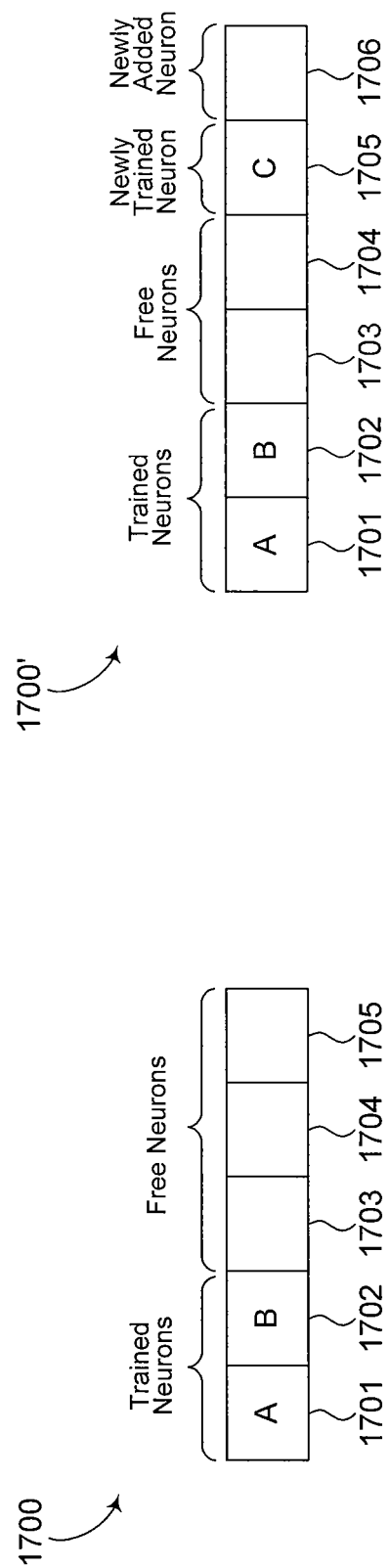

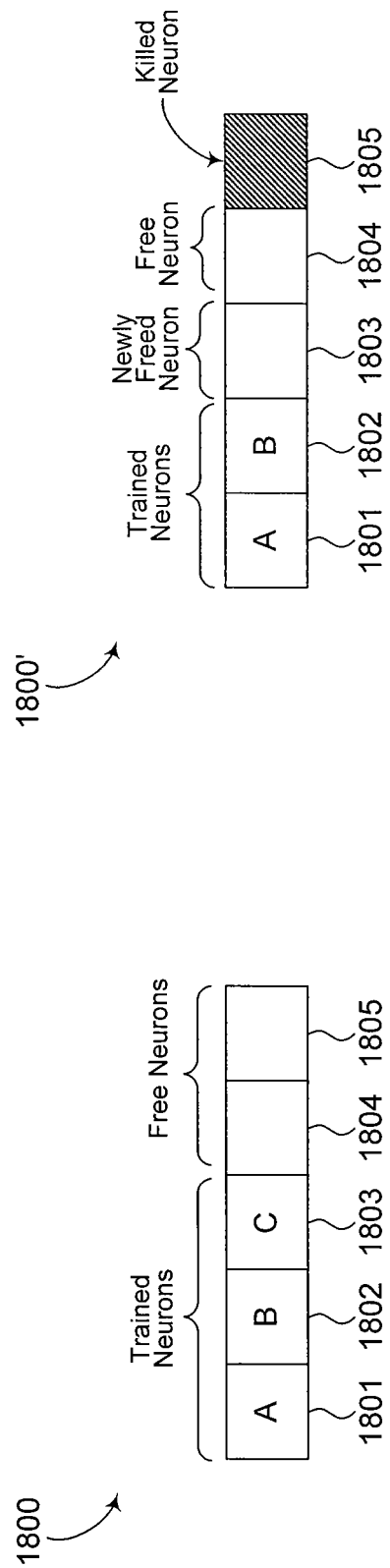

NEURAL SEGMENTATION OF AN INPUT SIGNAL AND APPLICATIONS USING SIMULATED NEURONS, AND A PHASE MODULATOR

BACKGROUND OF THE INVENTION

1. Field of the Invention

The present invention is generally directed to autonomous systems. More particularly, the present invention is directed to the use of simulated neurons in autonomous systems.

2. Background Art

An autonomous system can be trained to operate in a real or virtual world. Once trained, an ideal autonomous system would operate with minimal or no human direction. Several different types of technologies have been used in attempts to develop a truly autonomous system. These technologies include, for example, artificial intelligence, neural networks, and brain-based devices.

Artificial intelligence attempts to achieve autonomous behavior based on rules set forth in a computer program. To achieve autonomous behavior, a computer program would likely require a very large number (e.g., millions, billions, or trillions) of rules. Due to the number of rules likely required, artificial intelligence is currently a disfavored option for developing a truly autonomous system.

Neural networks attempt to achieve autonomous behavior based on a network of simulated neurons that are connected in a manner suggestive of connections between real neurons in humans. In humans, a first neuron may fire in response to an external stimulus. In response to the firing of the first neuron, other neurons connected to the first neuron may also fire. Similarly, a first simulated neuron in an input layer of a neural network can become active (e.g., fire) in response to stimulus to the neural network. One or more simulated neurons connected to the first simulated neuron may become active (e.g., fire) in response to the activity (e.g., firing) of the first neuron. Whether the activity of the first simulated neuron causes other simulated neurons to become active is dependent on at least two factors: (i) a weighting function associated with a connection between the first simulated neuron and each other simulated neuron to which the first simulated neuron is connected; and (ii) the threshold activity level required to cause each other simulated neuron to become active. To train the neural network (i.e., to cause the neural network to behave in a desired way), the weighting function associated with each connection is adjusted in response to different types of stimuli, but the connections between the simulated neurons remain the same. A typical neural network includes at least two layers of simulated neurons (e.g., an input layer and an output layer) and may optionally include additional layers (e.g., hidden layers). In a simple two-layer neural network, each simulated neuron in the first layer is connected to one or more simulated neurons in the second layer, and each connection is associated with a weighting function.

Brain-based devices are similar to neural networks, but more-closely model real neurons in humans. Like neural networks, brain-based devices attempt to achieve autonomous behavior based on a network of simulated neurons that are connected in a manner suggestive of connections between real neurons in humans. However, unlike neural networks, brain-based devices may include different types of connections (e.g., excitatory or inhibitory) between the simulated neurons, and the anatomy (e.g., topology) of the connections in a brain-based device may be more complex than in neural networks. In addition, in a brain-based device the activity of a first simulated neuron may be based not only on the activity of other simulated neurons to which it is connected (like in neural networks), but also based on the relative time when the other simulated neurons are active (like in real neural systems in animals and humans).

Regardless of whether artificial intelligence, neural networks, or brain-based devices are used, an autonomous system should ideally—at a minimum—be able to identify content in the real or virtual world in order to operate in a self-sufficient manner. Once content in the real or virtual world is identified, the autonomous system can respond or be configured to respond in an appropriate manner based on the identified content. Unfortunately, currently available autonomous systems have difficulty identifying and/or distinguishing content in real-world environments.

Given the foregoing, what is needed is an autonomous system that can better identify content in a real-world environment, and applications thereof.

BRIEF SUMMARY OF EMBODIMENTS OF THE INVENTION

The present invention meets the above-described needs by providing a brain-based device that is configured to segment content of an input signal, and applications thereof.

For example, an embodiment of the present invention provides a method for processing an input signal using a plurality of simulated neurons, wherein each simulated neuron is connected to one or more other simulated neurons, and each simulated neuron is associated with an activity and a phase. The method includes several steps. In a first step, the activity and the phase of each simulated neuron is set based on the activity and the phase of the one or more other simulated neurons connected to each simulated neuron. In a second step, the activity and the phase of each of the plurality of simulated neurons is modulated based on a plurality of modulation functions. In a third step, one or more distinct entities in the input signal are identified based on one or more distinct collections of simulated neurons that have substantially distinct phases. The one or more entities identified in the input signal may include, for example, one or more objects moving against a background (if the input signal is a video signal) or one or more human speakers talking in a noisy environment (if the input signal is an audio signal).

Another embodiment of the present invention provides a computer-program product comprising a computer-readable storage medium having instructions stored thereon that, if executed by a computing device, cause the computing device to perform the above-described method.

A further embodiment of the present invention provides a system for processing an input signal. The system includes simulated neurons, a phase modulator, and an entity-identifier module. Each simulated neuron is connected to one or more other simulated neurons and is associated with an activity and a phase. The activity and the phase of each simulated neuron are set based on (i) an input signal and (ii) the activity and the phase of the one or more other simulated neurons connected to each simulated neuron. The phase modulator includes individual modulators that are each configured to modulate the activity and the phase of each of the plurality of simulated neurons based on a modulation function. The entity-identifier module is configured to identify one or more distinct entities (e.g., objects or sound sources) in the input signal based on one or more distinct collections of simulated neurons that have substantially distinct phases.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 2:
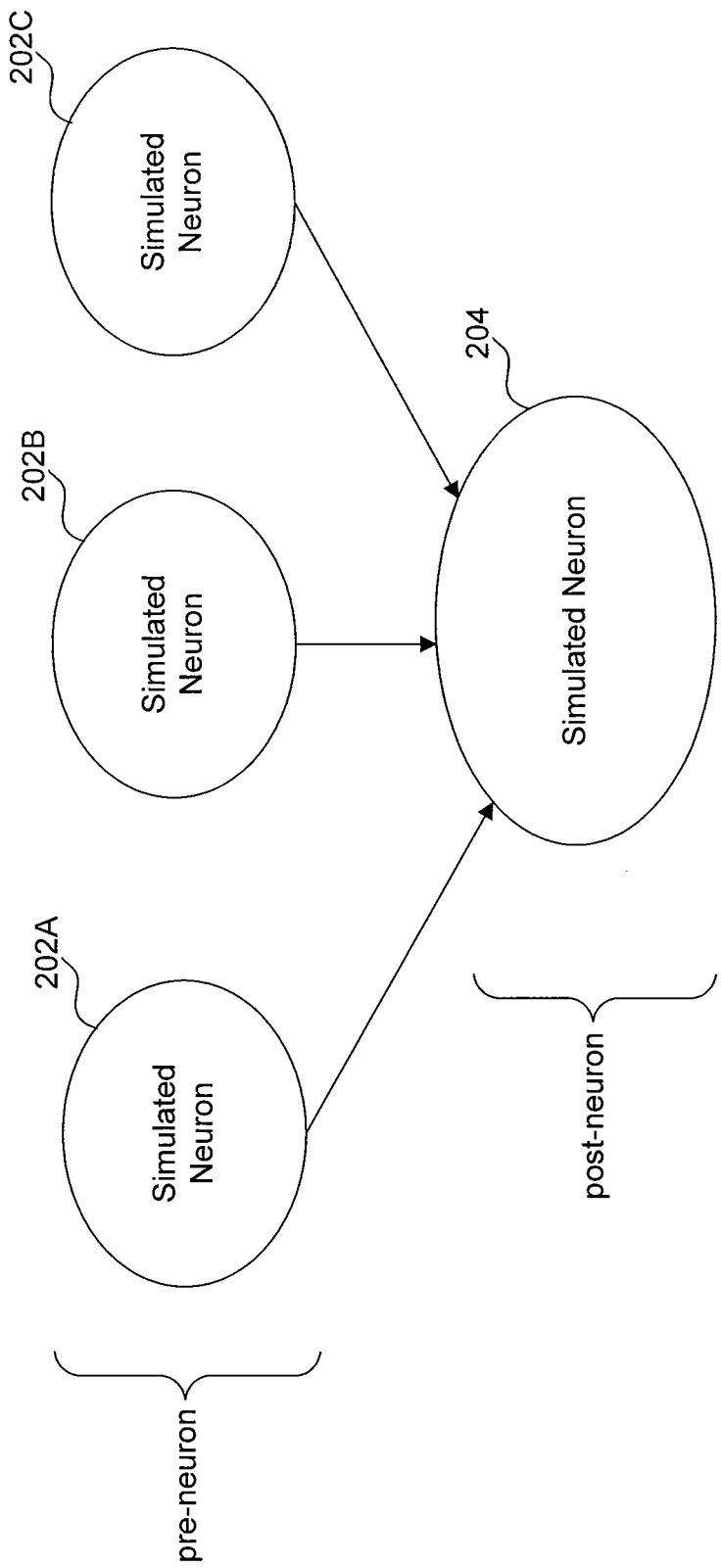
FIG. 2 illustrates an example neural anatomy in which three pre-neurons are connected to one post-neuron.
Figure 3A:
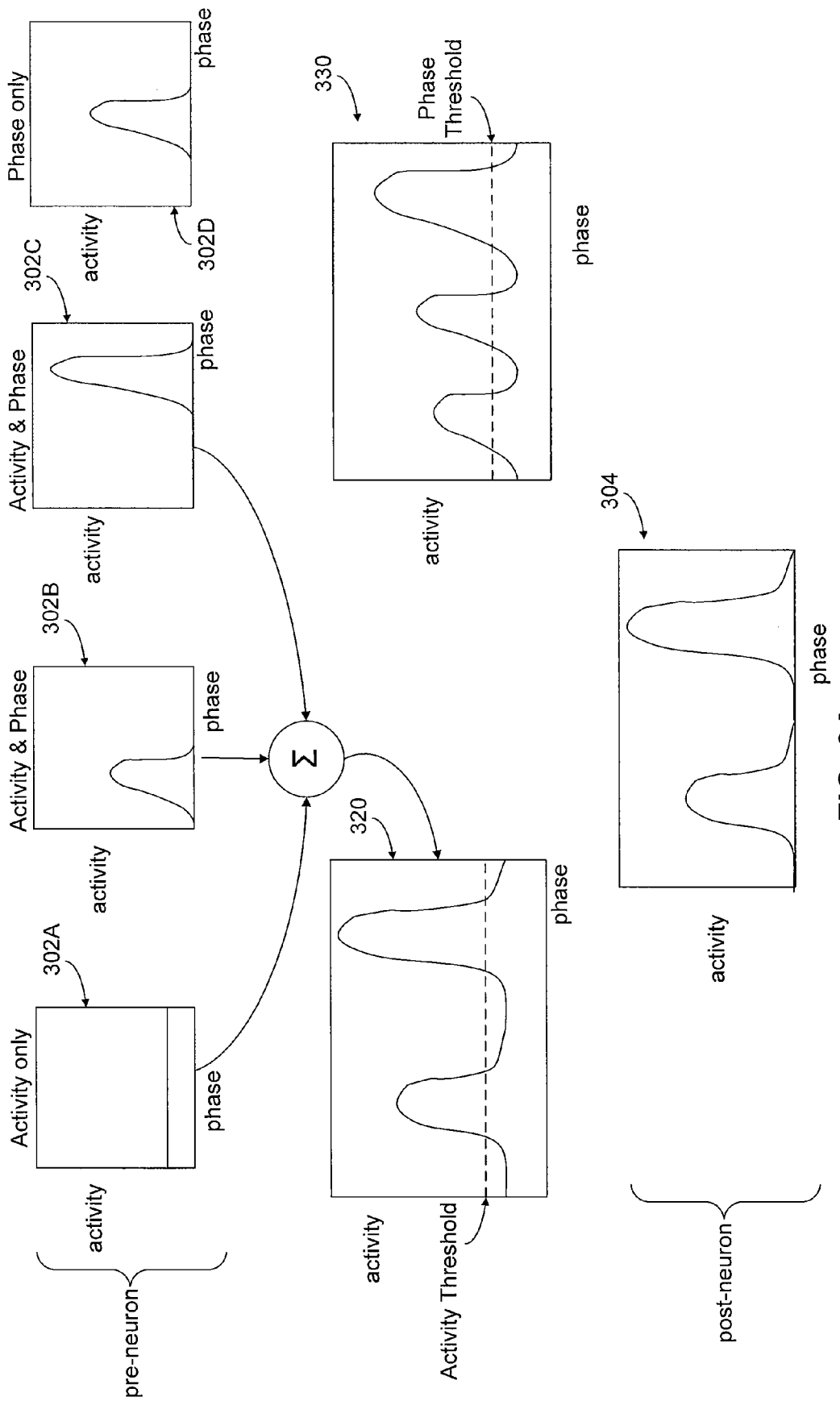
Figure 3B:
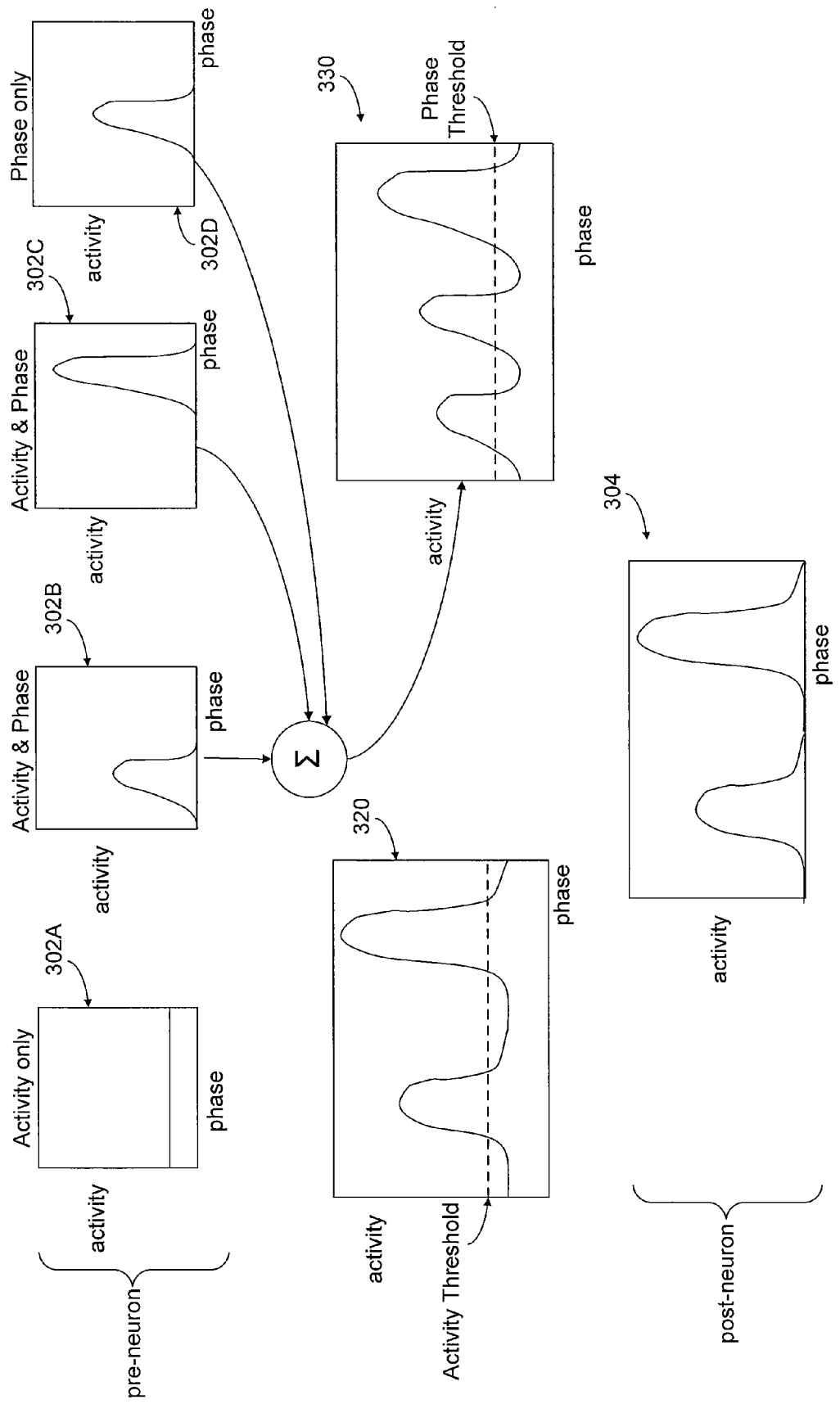
Figure 3C:
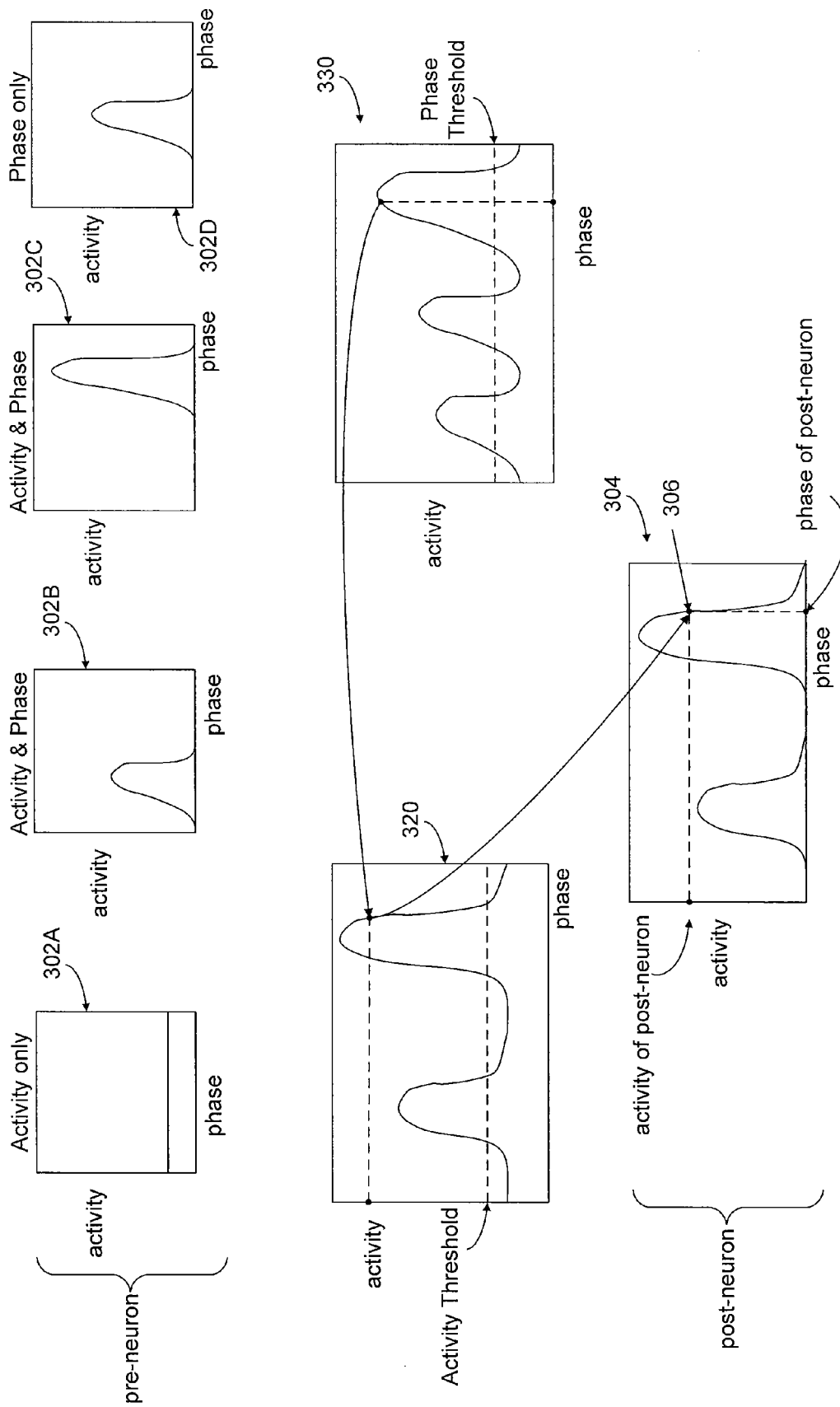

FIGS. 3A-C graphically illustrate an example of how the activity and phase of pre-neurons of FIG. 2 are used to set the activity and phase of the post-neuron of FIG. 2.

Figure 4:
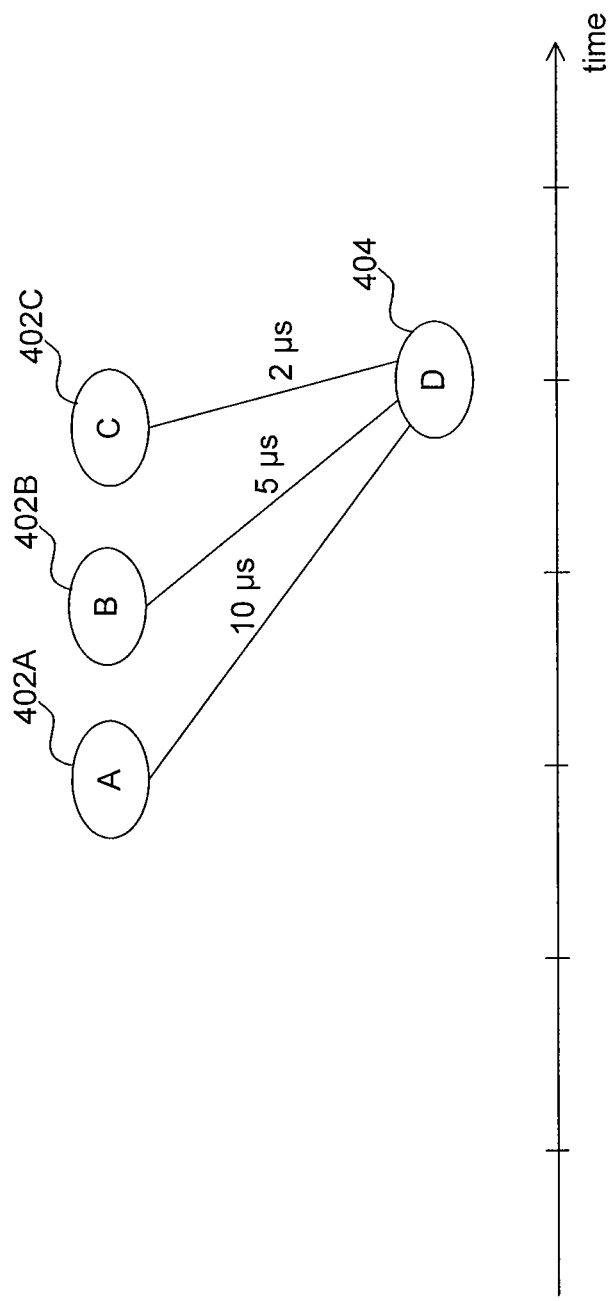

FIG. 4 illustrates example travel times of neural signals from pre-neurons to a post-neuron.

Figure 5:
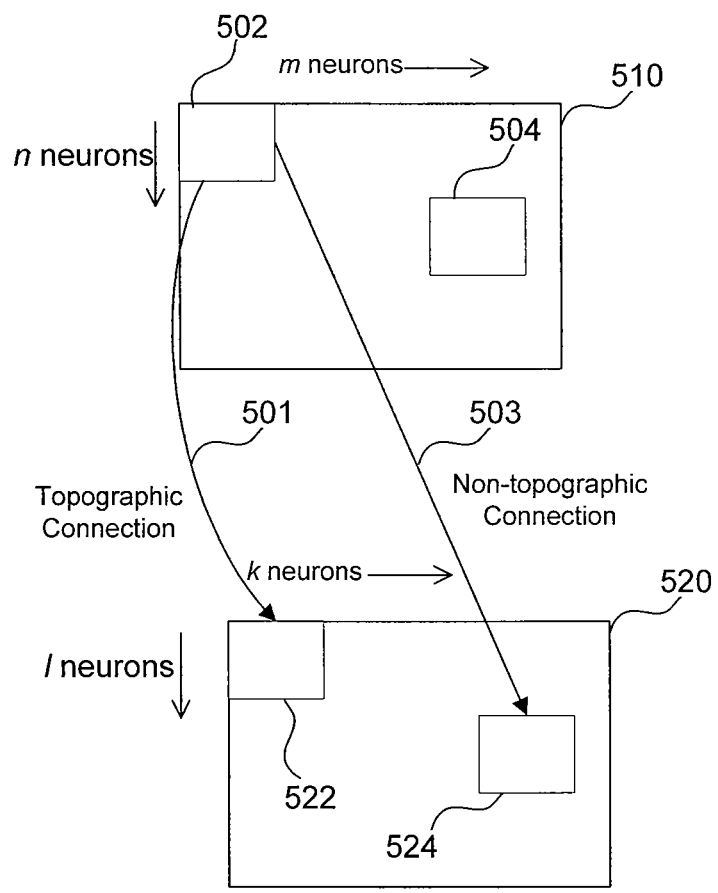

FIG. 5 illustrates example connection types between a neuron in a first neural group and one or more neurons in a second neural group.

Figure 6:
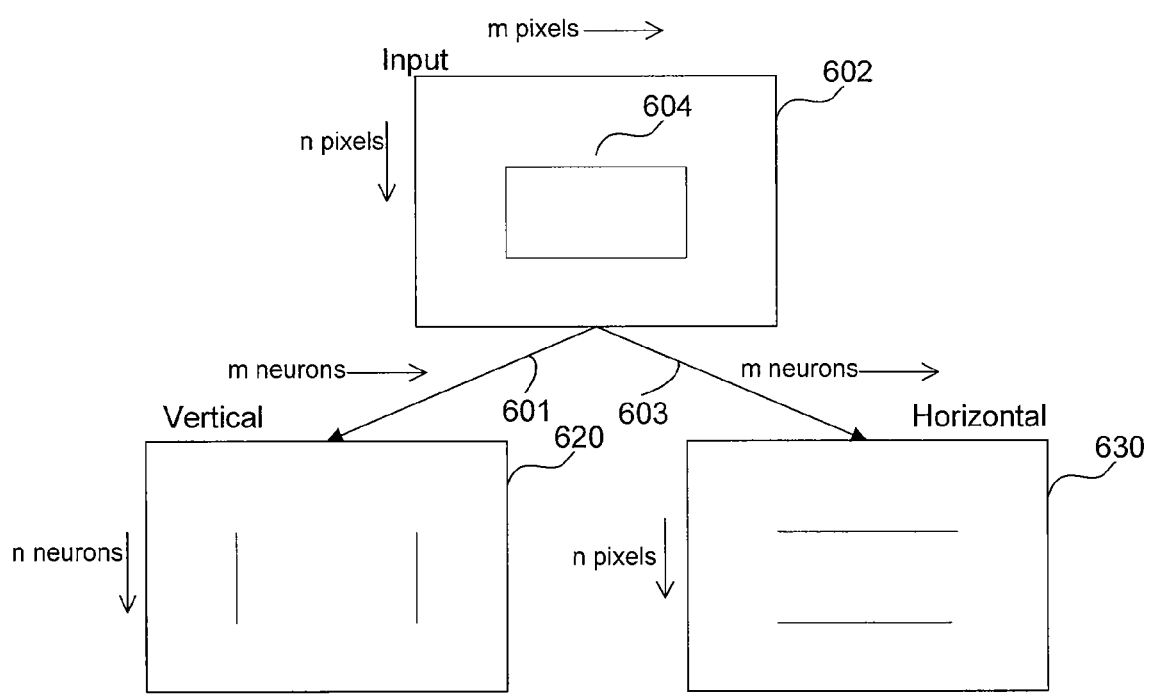

FIG. 6 illustrates example feature-dependent neural groups.

Figure 7:
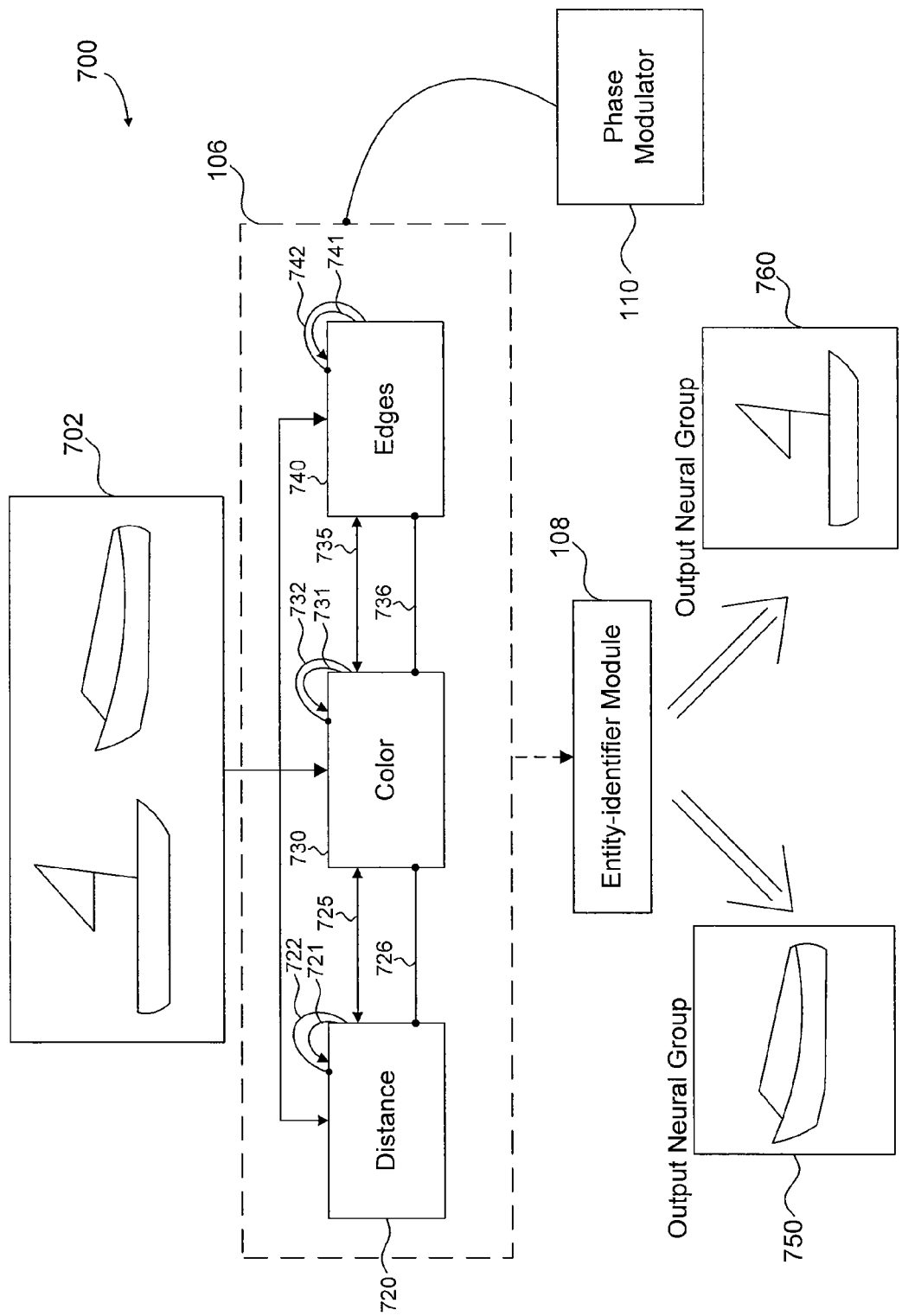

FIG. 7 illustrates an example anatomy for segmenting neurons to identify entities included in an input signal in accordance with an embodiment of the present invention.

Figure 8B:
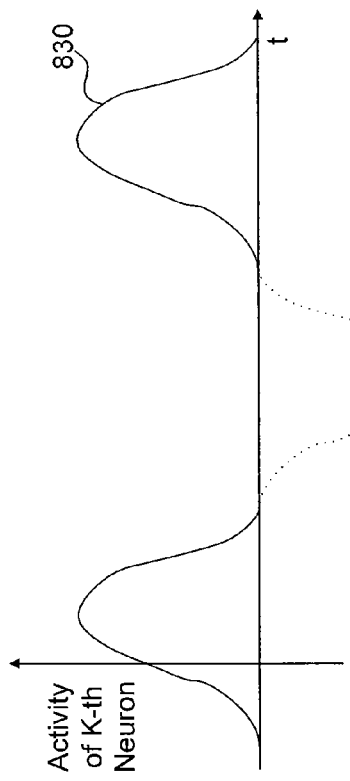
Figure 8A:
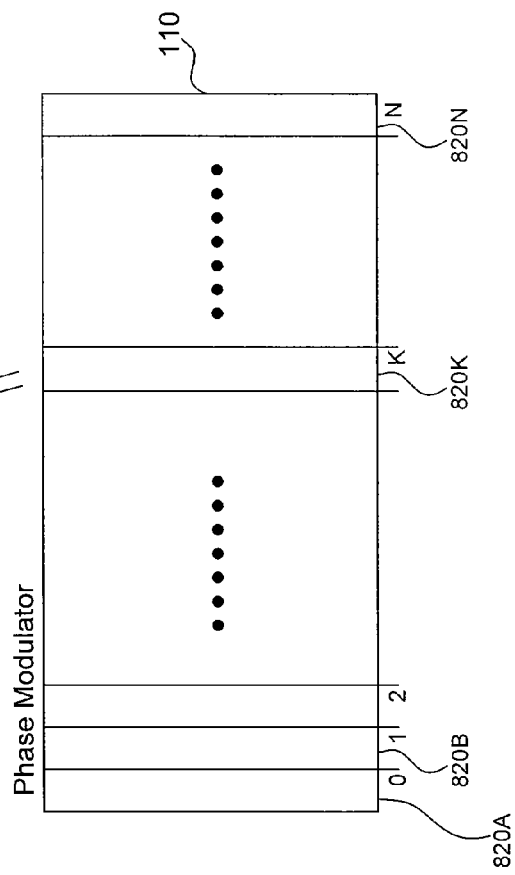

FIG. 8A illustrates a plurality of individual modulators included in a phase modulator in accordance with an embodiment of the present invention.

FIG. 8B illustrates an example modulation function implemented by an individual modulator of the phase modulator of FIG. 8A in accordance with an embodiment of the present invention.

Figure 9:
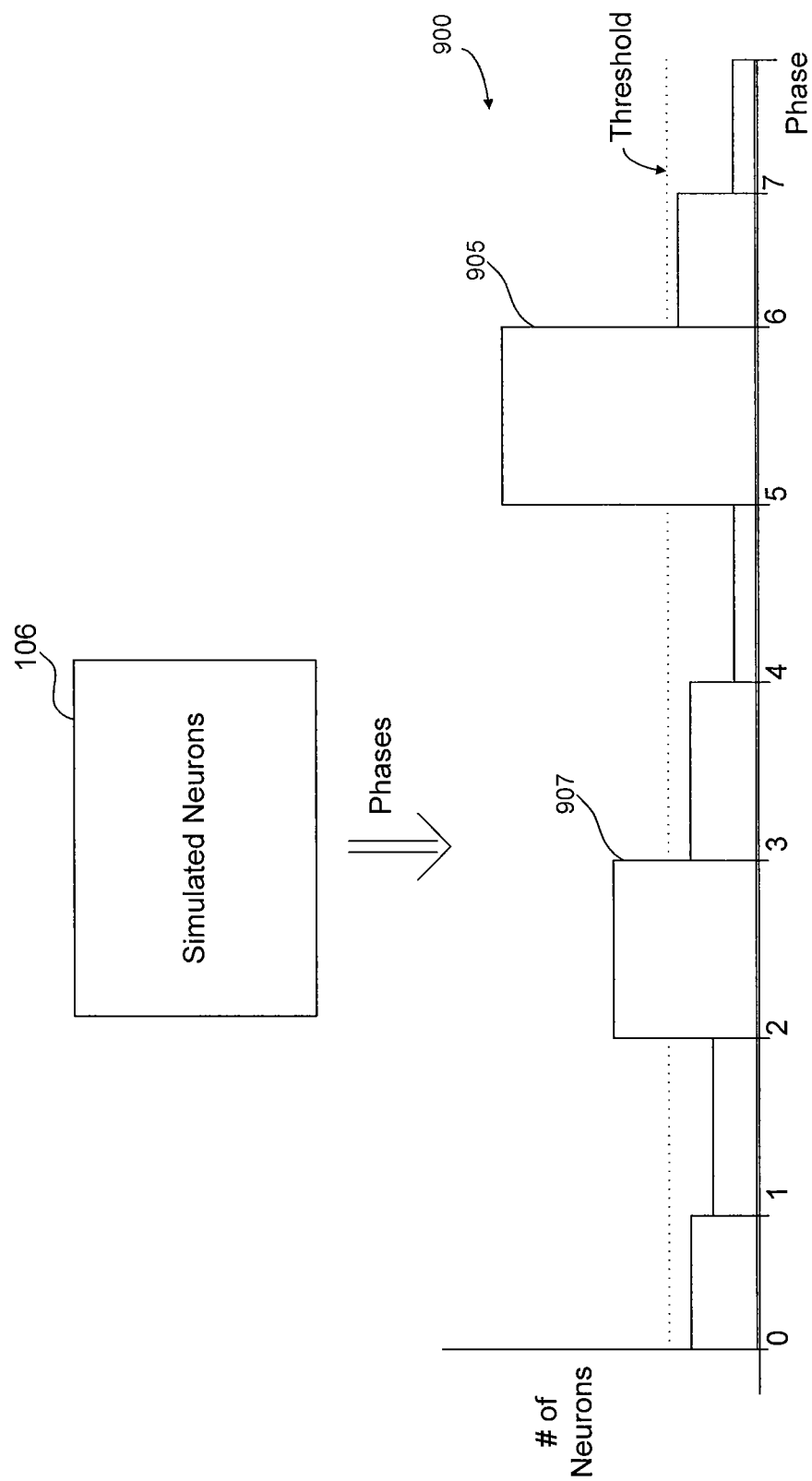

FIG. 9 illustrates an example method for identifying entities of an input signal based on histograms in accordance with an embodiment of the present invention.

Figure 10:
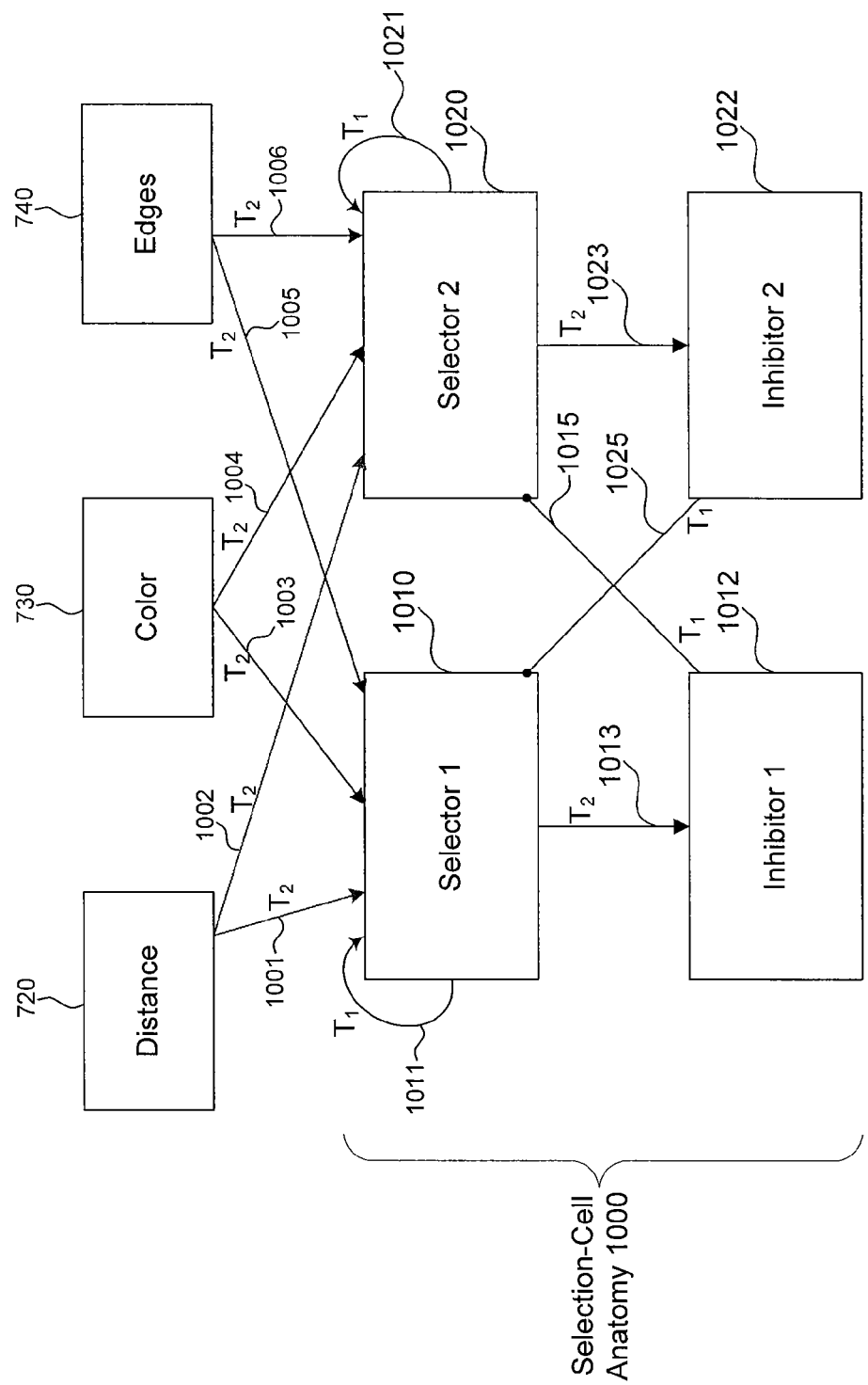

FIG. 10 illustrates an example method for identifying entities of an input signal based on a selection-cell anatomy in accordance with an embodiment of the present invention.

Figure 11:
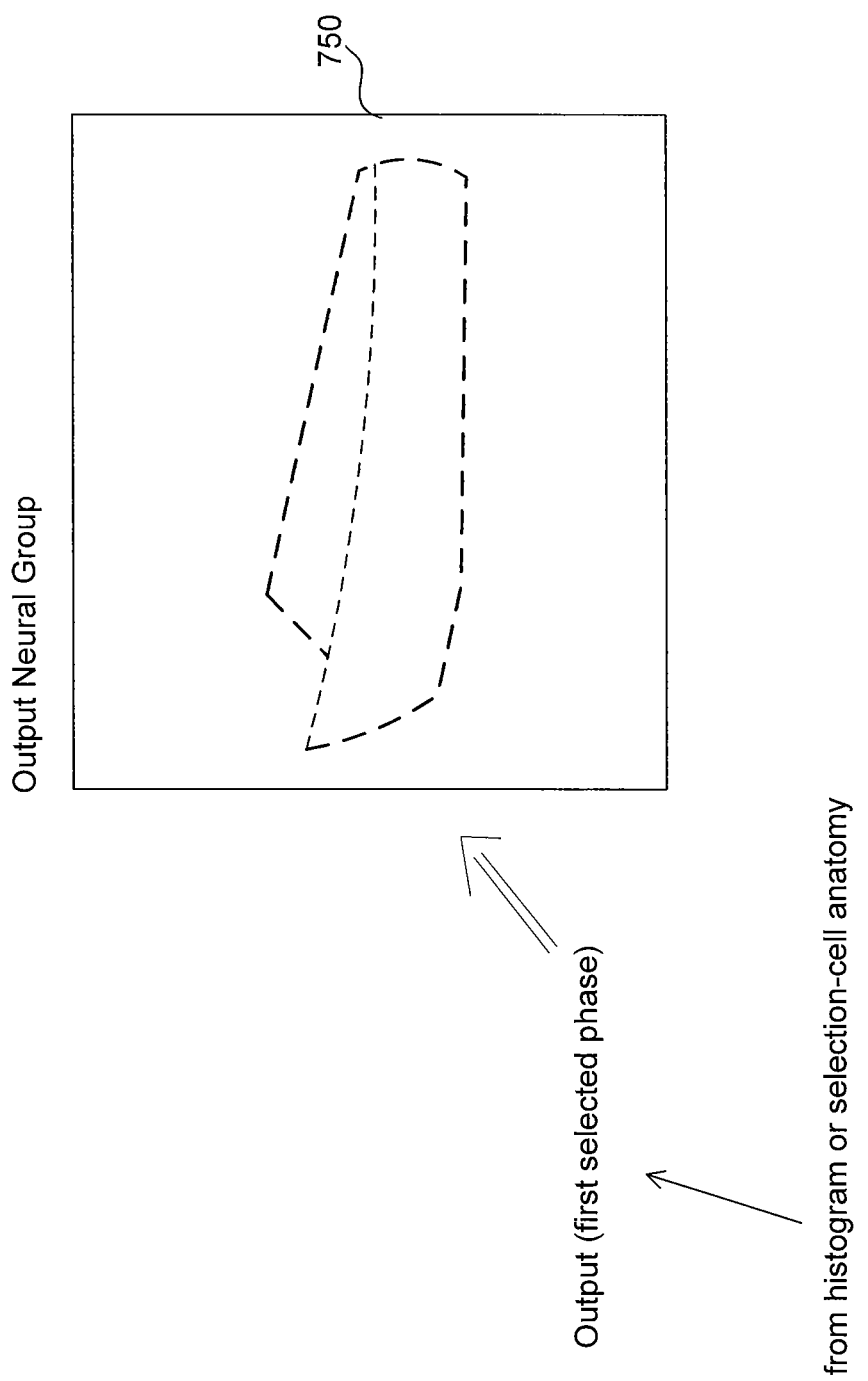
Figure 12:
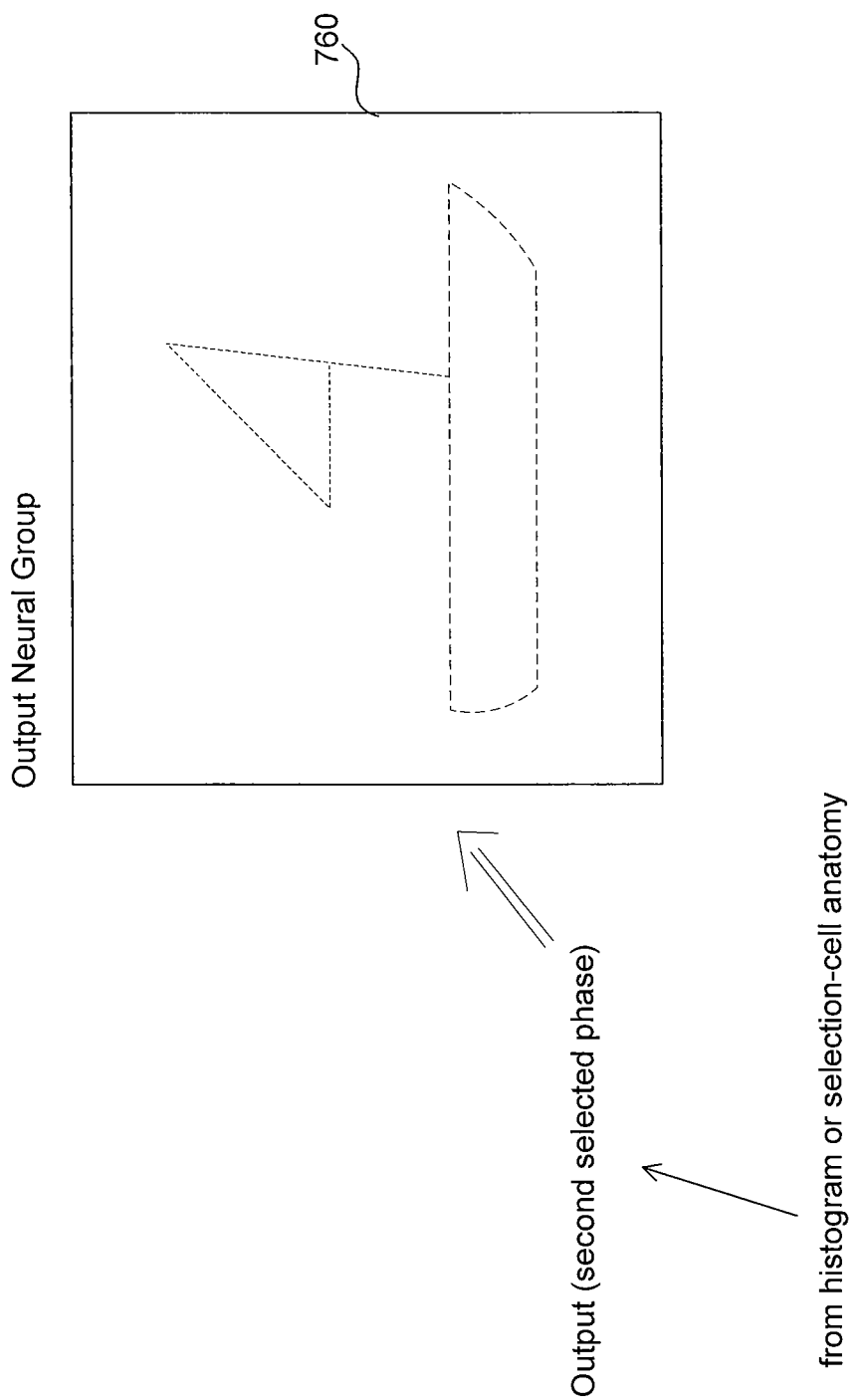

FIGS. 11 and 12 are an example illustration of how entities are identified based on distinct collections of simulated neurons having substantially distinct phases.

Figure 13:
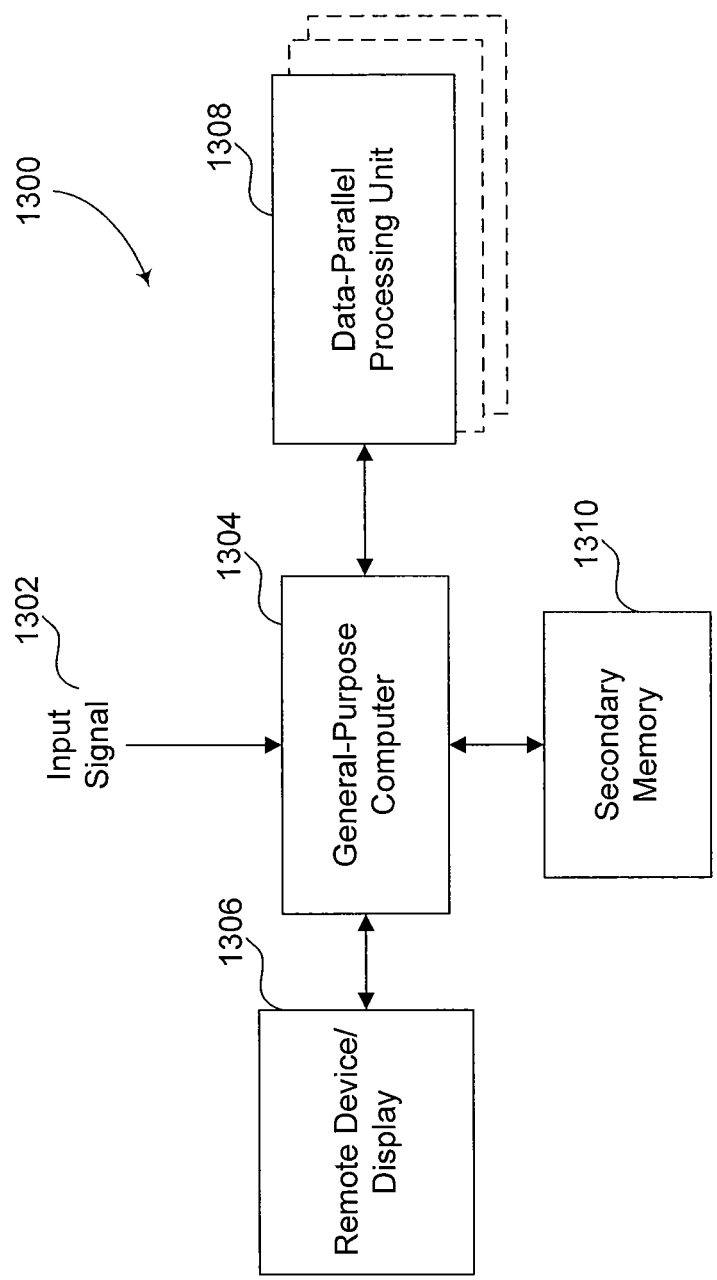

FIG. 13 illustrates an example system for identifying entities included in an input signal based on simulated neurons in accordance with an embodiment of the present invention.

Figure 14:
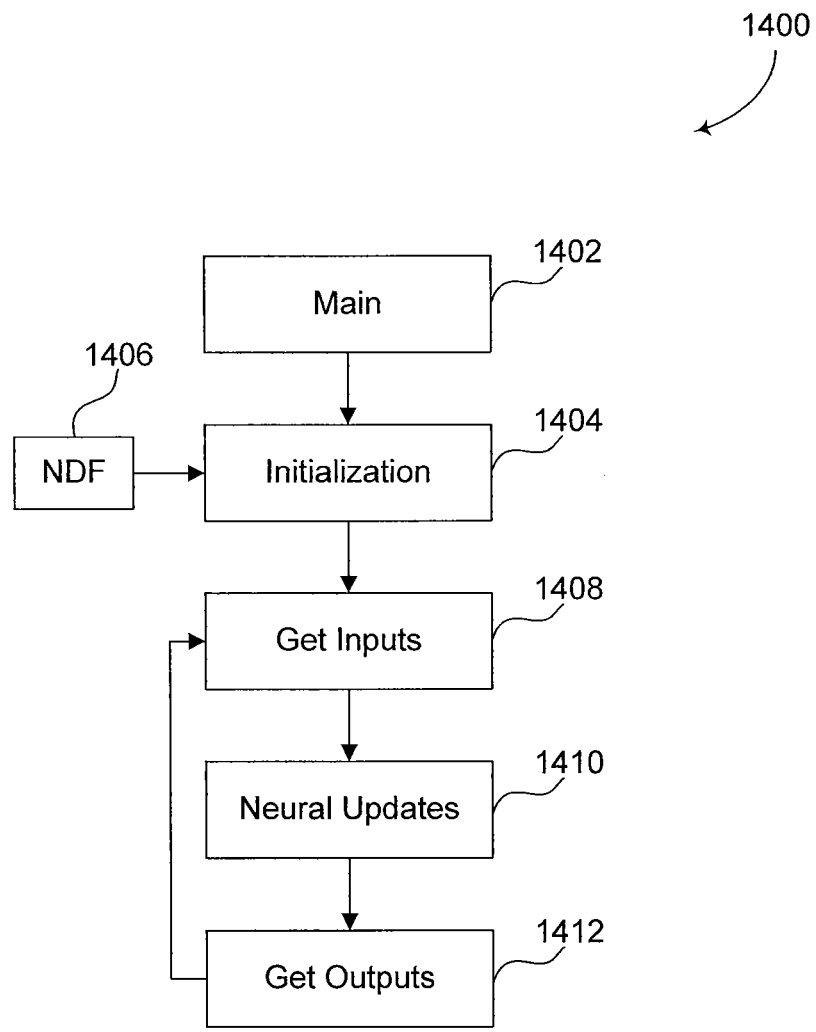

FIG. 14 illustrates an example process for identifying entities included in an input signal based on simulated neurons in accordance with an embodiment of the present invention.

Figure 15:
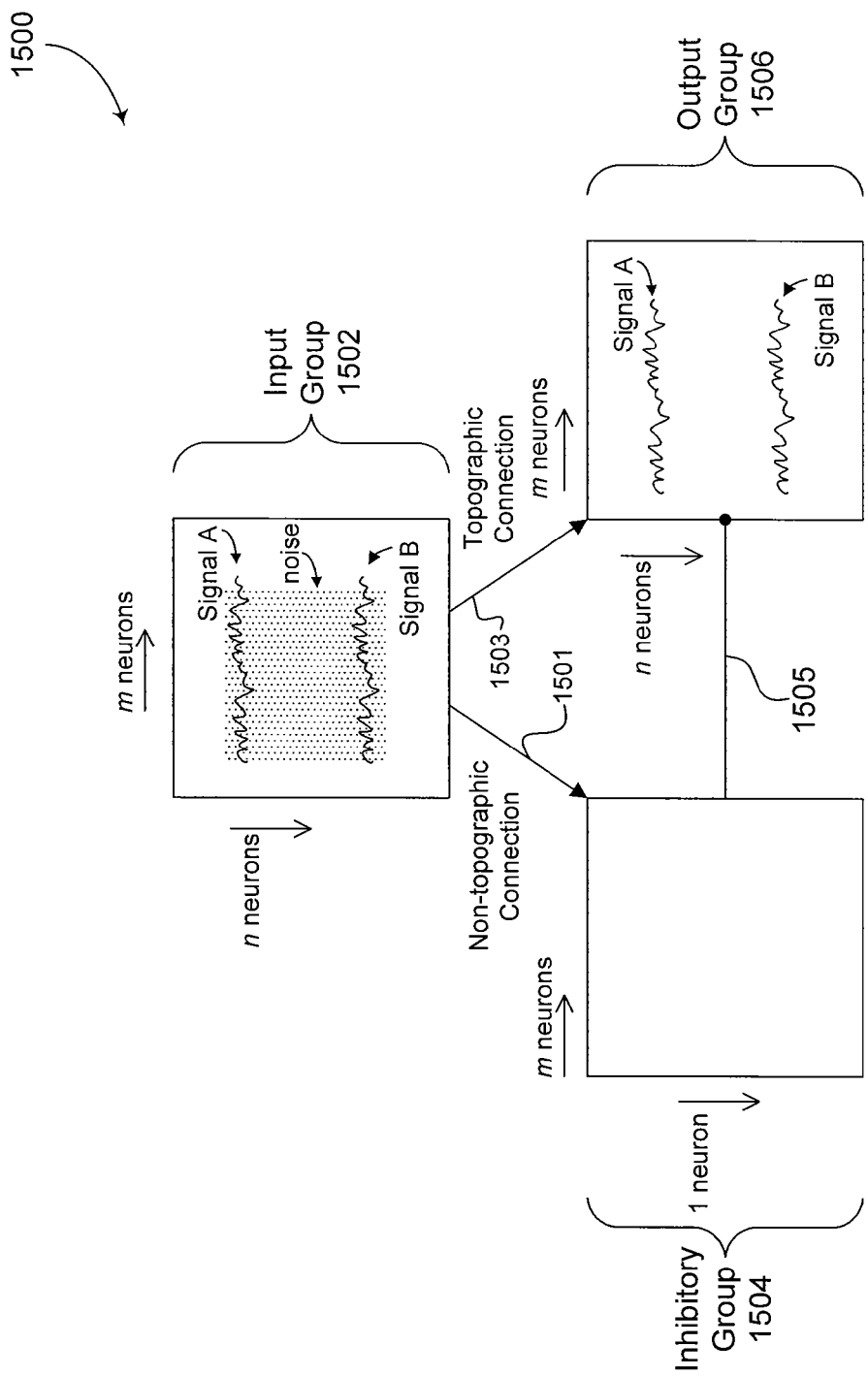

FIG. 15 illustrates an example inhibitory neural anatomy in accordance with an embodiment of the present invention.

Figure 16B:
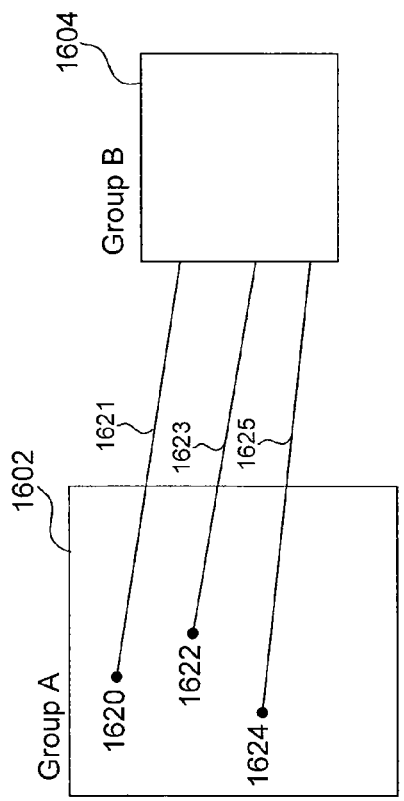
Figure 16A:
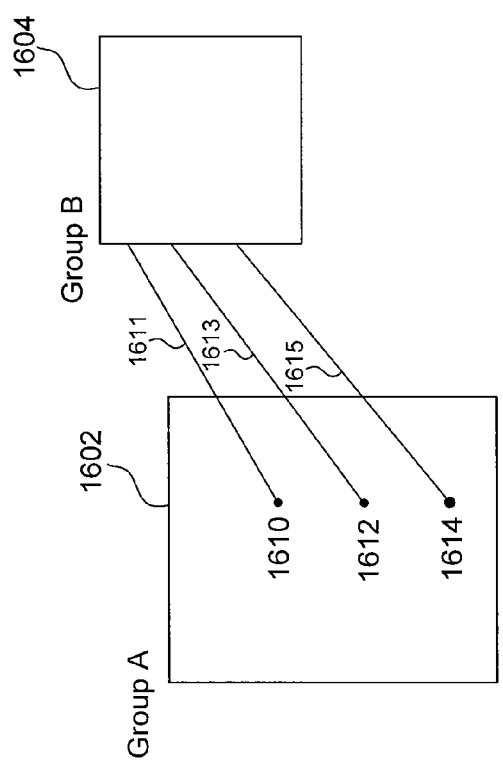

FIGS. 16A and 16B collectively illustrate repurposing/reconnecting of simulated neurons in accordance with an embodiment of the present invention.

FIGS. 17A and 17B collectively illustrate creation of a simulated neuron in accordance with an embodiment of the present invention.

FIGS. 18A and 18B collectively illustrate the termination (e.g., death) of a simulated neuron in accordance with an embodiment of the present invention.

Figure 19:
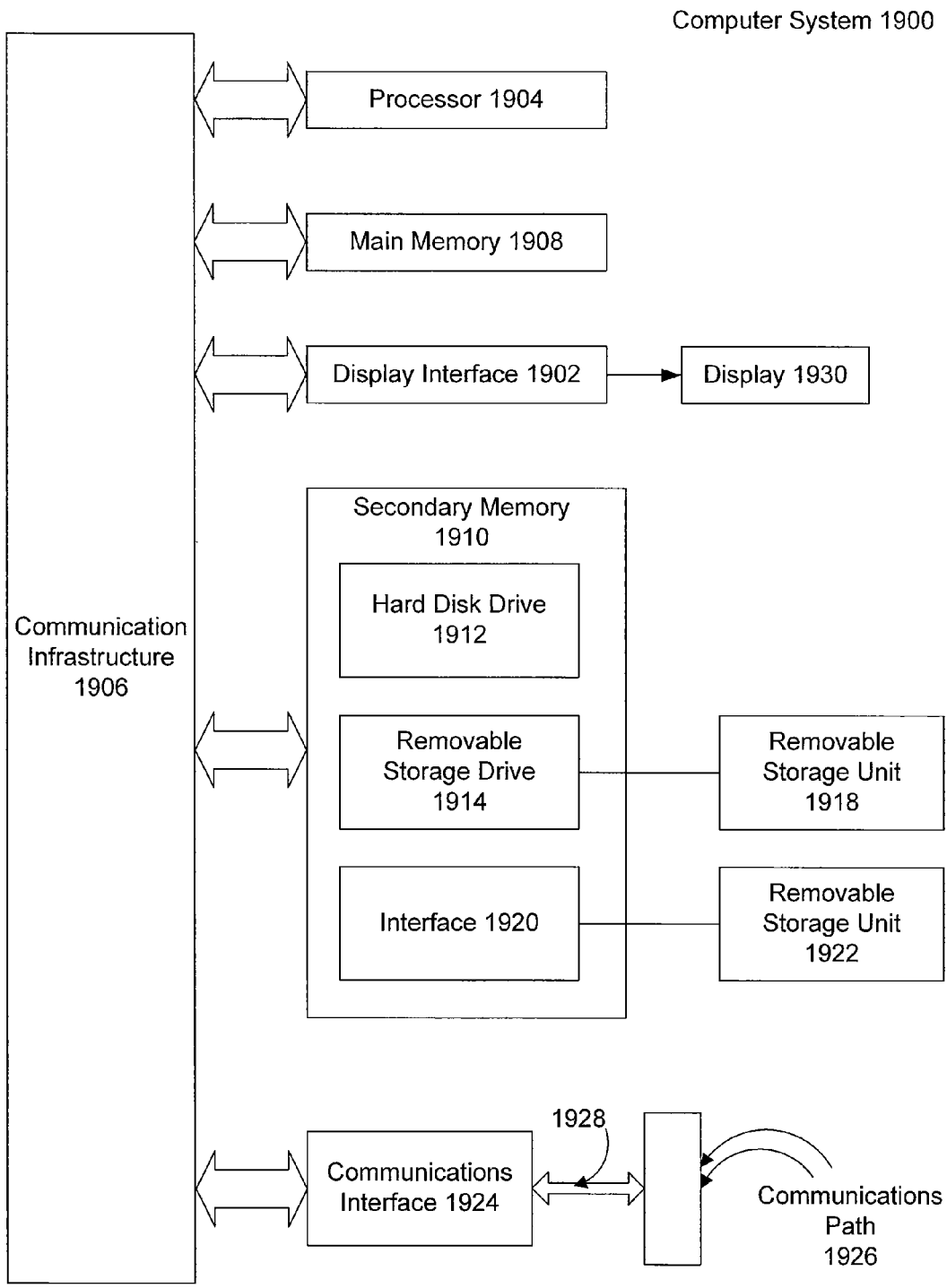

FIG. 19 illustrates an example computer system in accordance with embodiments of the present invention.

Figure 20:
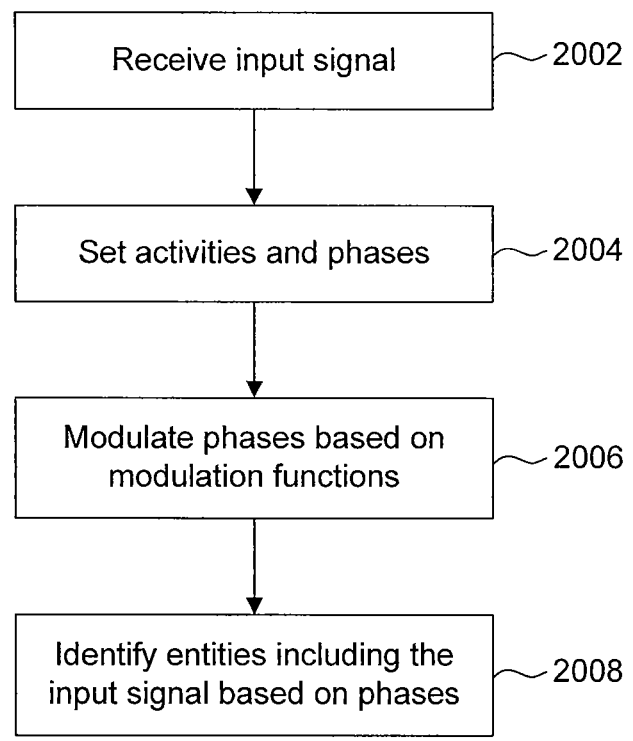

FIG. 20 is a flow chart of an example method for identifying entities included in an input signal in accordance with an embodiment of the present invention.

Figure 21:
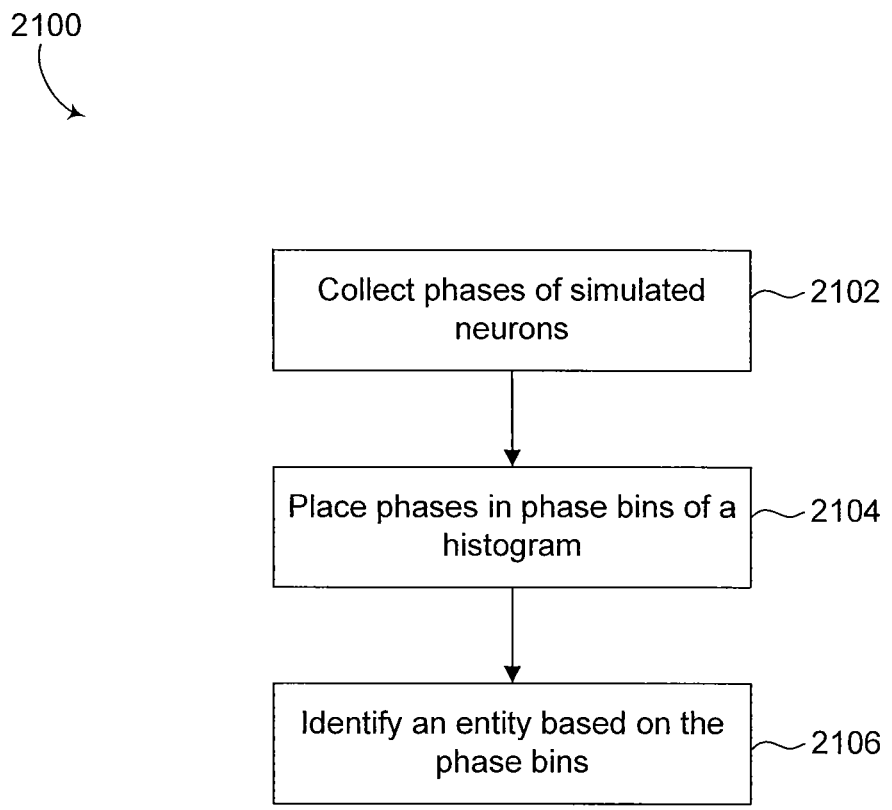

FIG. 21 is a flow chart of an example method for identifying entities of an input signal based on histograms in accordance with an embodiment of the present invention.

Figure 22:
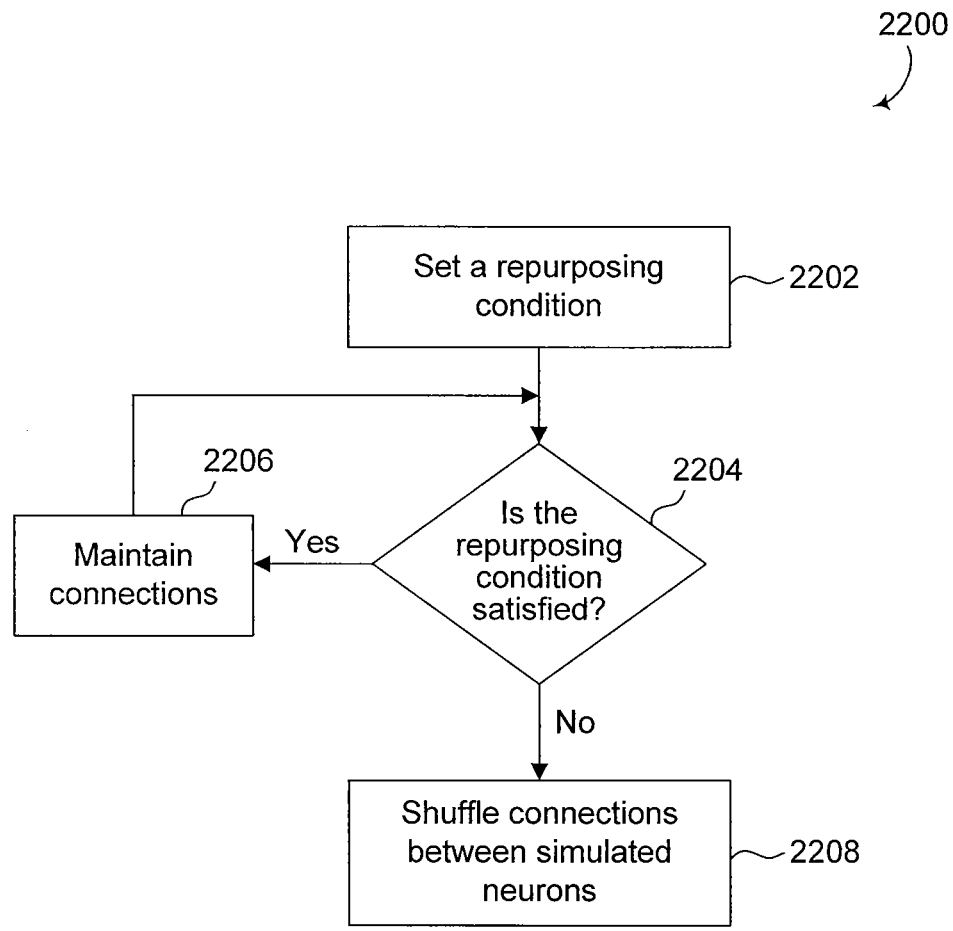

FIG. 22 is a flow chart of an example method for repurposing/reconnecting simulated neurons in accordance with an embodiment of the present invention.

Figure 23:
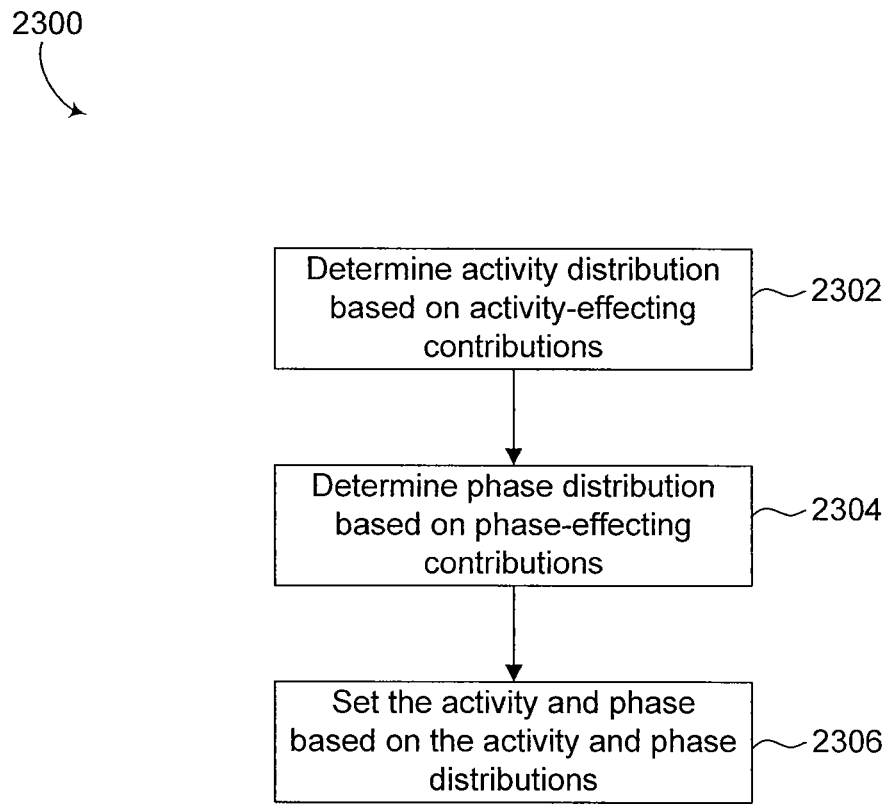

FIG. 23 is a flow chart of an example method for setting an activity and phase of a post-neuron based on an activity and phase of one or more pre-neurons in accordance with an embodiment of the present invention.

Figure 24:
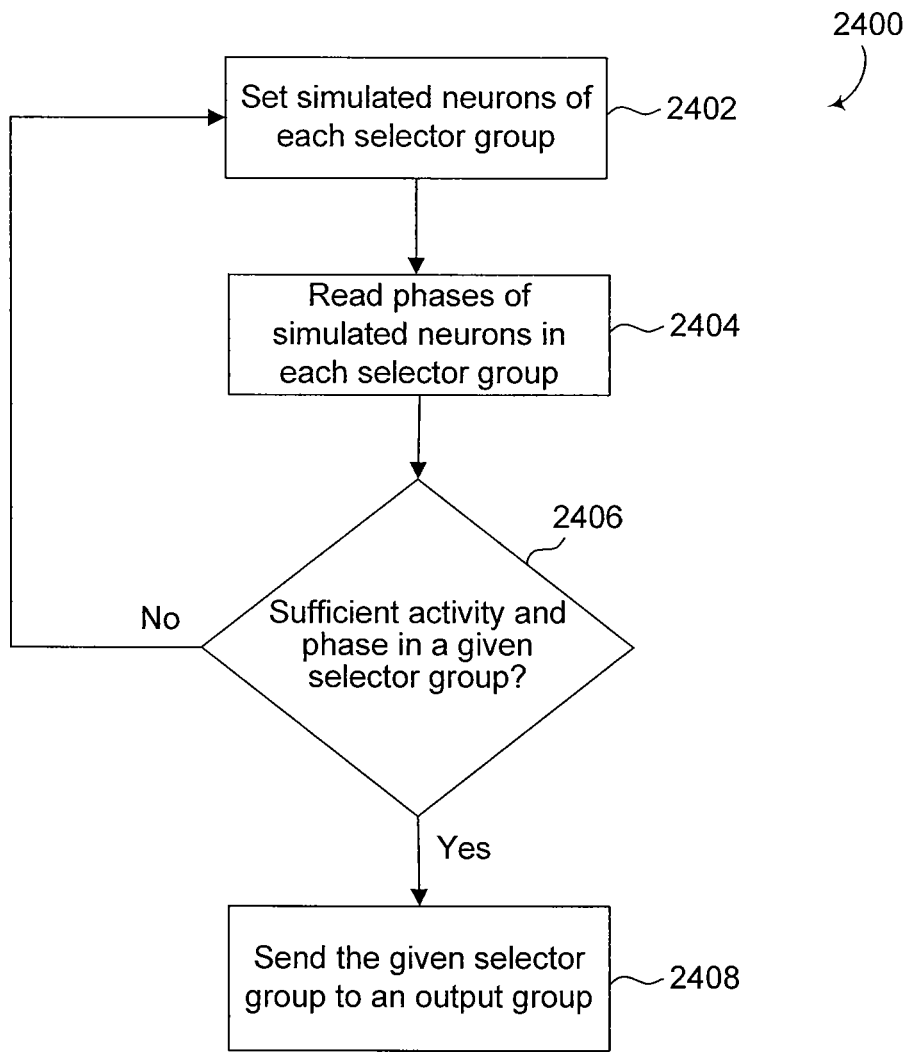

FIG. 24 is a flow chart illustrating functionality of a selection-cell anatomy in accordance with an embodiment of the present invention.

Figure 25:
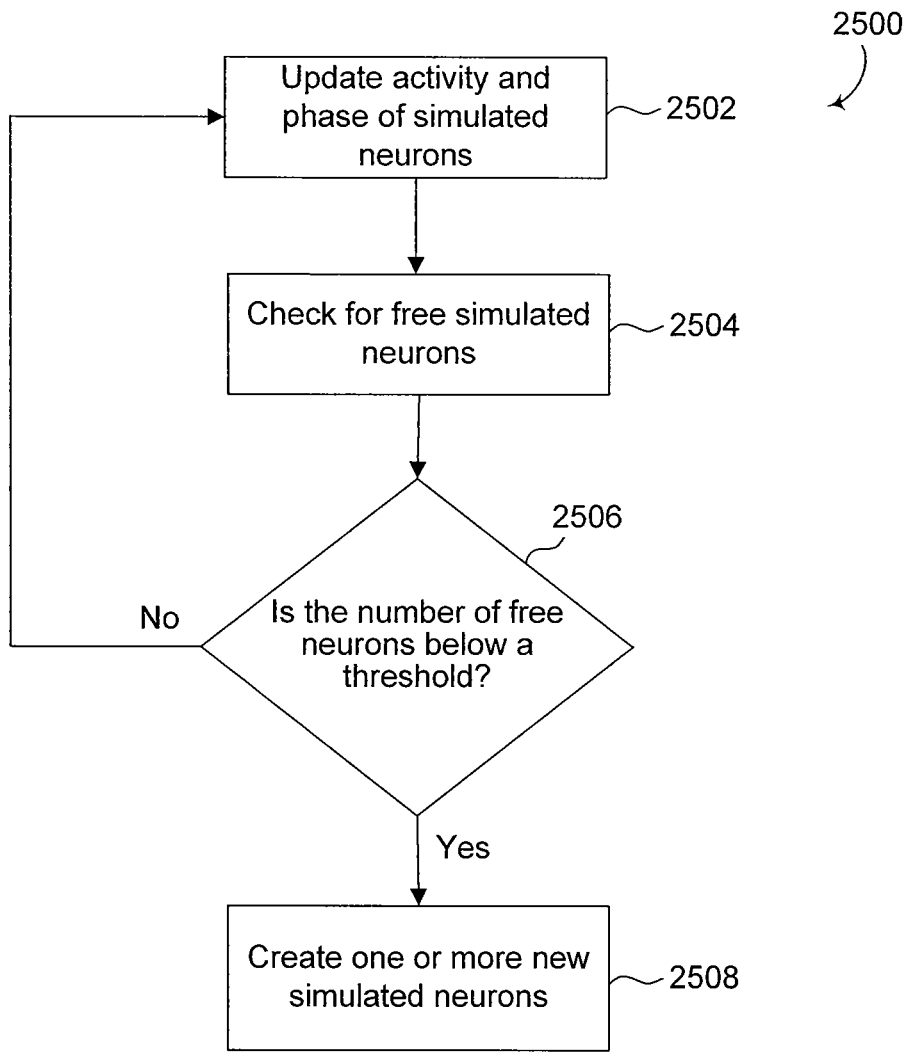

FIG. 25 is a flow chart illustrating functionality of a dynamic (e.g., creation-type) anatomy in accordance with an embodiment of the present invention.

Figure 26:
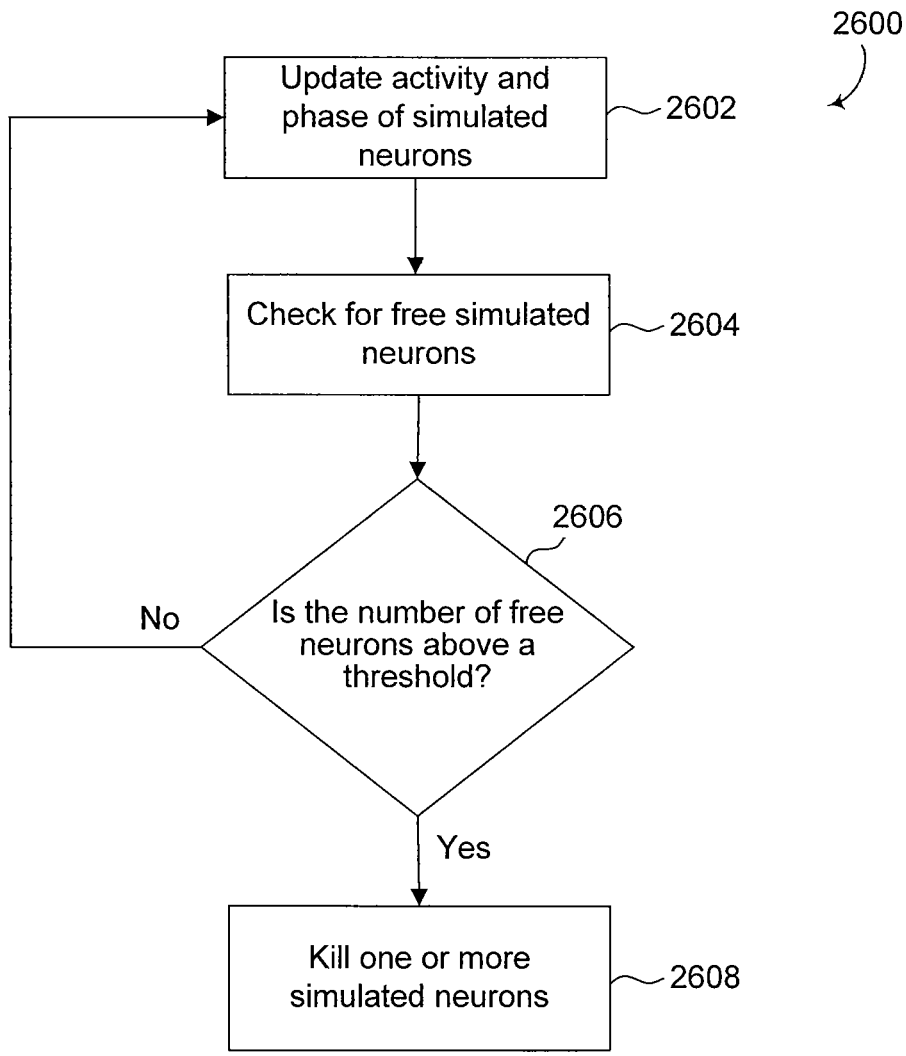

FIG. 26 is a flow chart illustrating functionality of another dynamic (e.g., destruction-type) anatomy in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Overview of Embodiments of the Invention
II. Description of Simulated Neurons
  A. Overview of Activity and Phase of Simulated Neurons
  B. Mathematics of Activity and Phase of Simulated Neurons
  C. Neural Groups and Connections
  D. Mathematics of Connection Strength
III. External Modulation for Neural Segmentation of an Input Signal
  A. Example Neural Anatomy
  B. Phase Modulation
  C. Entity Identification
IV. Example System for Neural Simulation
V. Example Operation of Neural Simulation
VI. Function-Specific Anatomies
  A. Selection-Cell Anatomy
  B. Inhibitory Anatomy
VII. Dynamic Anatomies
  A. Reconnecting/Repurposing Anatomies
  B. Creation-Type Dynamic Anatomy
  C. Destruction-Type Dynamic Anatomy
VIII. Example Computer System and Software Implementation
XI. Conclusion I. Overview of Embodiments of the Invention Embodiments of the present invention include brain-based devices that are configured to segment content of an input signal(s), and applications thereof. As used herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In accordance with an embodiment, a brain-based device is configured to segment an input signal based on entities of or within the input signal. In an example in which the input signal is a video signal, a brain-based device in accordance with an embodiment of the present invention may be configured to segment the video signal based on objects included in the video signal. For example, the brain-based device may be configured to identify objects (e.g., boats, cars, people, etc.) moving against a background. In another example in which the input signal is an audio signal, a brain-based device in accordance with an embodiment of the present invention may be configured to segment the audio signal based on sound sources included in the audio signal. For example, the brain-based device may be configured to identify a first human speaker and a second human speaker talking in a noisy environment. These and other uses of a brain-based device in accordance with an embodiment of the present invention will become apparent to persons skilled in the relevant art(s) from reading the description contained herein. For example, the input signal may comprise, but is not limited to, a video signal, an audio signal, a radar signal, a sonar signal, stock-market data, email text, data regarding credit-card use, and/or other types of input signals.

Figure 1:
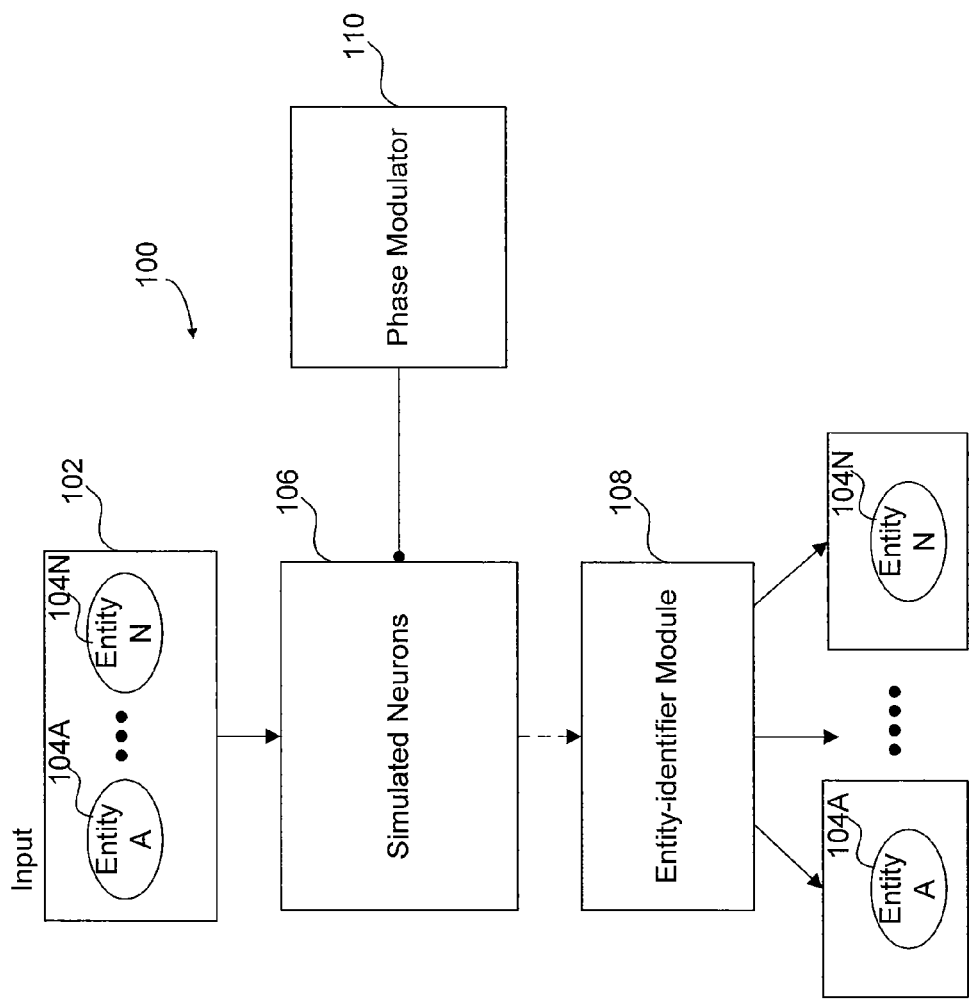
FIG. 1 illustrates segmentation of simulated neurons to identify entities included in an input signal in accordance with an embodiment of the present invention.

FIG. 1 illustrates an example brain-based device 100 for segmenting an input signal 102 in accordance with an embodiment of the present invention. Referring to FIG. 1, input signal 102 comprises a plurality of entities, including entities 104A through 104N. Entities 104 may be, for example, objects (e.g., boats, cars, people, etc.), sound sources, or other characteristics of or included in input signal 102. To identify (i.e., distinguish) entities 104 of or included in input signal 102, brain-based device 100 includes simulated neurons 106, a phase modulator 110, and an entity-identifier module 108.

Simulated neurons 106 receive input signal 102. As explained in greater detail below, each simulated neuron 106 may be modeled in software as a memory array. Simulated neurons 106 are connected to each other based on projections defined in a network-description file. As explained in greater detail below, different types and topologies of connections, referred to herein as "anatomies," may be realized based on neural groups and projections specified in the network-description file. These anatomies may include, for example, function-specific anatomies and/or dynamics anatomies. (See Sections VI and VII, infra.) In addition to the anatomy of simulated neurons 106, each simulated neuron 106 is associated with two parameters—an activity and a phase. As explained in greater detail below, the activity of a first simulated neuron (post-neuron) depends on the activity and the phase of other simulated neurons (pre-neuron(s)) connected to the first simulated neuron in a similar manner to real neurons in real neural systems.

Phase modulator 110 includes a plurality of individual modulators connected to each simulated neuron 106. As described in more detail below (see, e.g., Section III.B, infra), each individual modulator of phase modulator 110 inhibits the activity of each simulated neuron 106 according to a modulation function. This modulation enables distinct collections of simulated neurons 106 to form, wherein each collection includes simulated neurons having substantially a single phase.

Entity-identifier module 108 is configured to identify each distinct collection of simulated neurons 106 having substantially a single phase. As described in more detail below (see, e.g., Section III.C, infra), each collection of simulated neurons 106 having substantially a single phase is representative of an entity 104 included in input signal 102—such that, for example, a first collection of simulated neurons having substantially a first phase is representative of a first entity 104A, a second collection of simulated neurons having substantially a second phase is representative of a second entity, a third collection of simulated neurons having substantially a third phase is representative of a third entity, and so on. Accordingly, by identifying each distinct collection of simulated neurons 106 having substantially a single phase, entity-identifier module 108 segments input signal 102 based on entities 104 included in input signal 102.

To more-fully describe how brain-based devices of embodiments of the present invention function to segment an input signal, it is first helpful to provide a description of simulated neurons.

II. Description of Simulated Neurons

Brain-based devices of embodiments of the present invention include a plurality of simulated neurons. Each simulated neuron has an activity and a phase, as described in more detail below in subsection A. Subsection B sets forth the mathematics used to calculate the activity and phase of simulated neurons according to an embodiment of the present invention. In addition, the simulated neurons may be organized in groups with connections between simulated neurons of each group, as described in more detail below in subsection C. Subsection D sets forth mathematics use to calculate the connection strength between simulated neurons.

A. Overview of Activity and Phase of Simulated Neurons

In an embodiment, each simulated neuron in a brain-based device has at least an activity and a phase. The activity of a simulated neuron is a parameter that roughly corresponds to the firing of a real neuron in an animal (e.g., human). The phase of a simulated neuron does not directly correspond to any real parameter of a real neuron, but roughly corresponds to the relative time when real neurons fire. This concept is described with reference to FIG. 4.

FIG. 4 illustrates a post-neuron 404 connected to three different pre-neurons—a first pre-neuron 402A, a second pre-neuron 402B, and a third pre-neuron 402C. In an animal, post-neuron 404 may be trained to fire only if the signal from each pre-neuron 402 arrives at post-neuron 404 at the same time. However, in the example of FIG. 4, due to the relative positioning of pre-neurons 402 with respect to post-neuron 404, the firing of first pre-neuron 402A may take approximately 10 μs to reach post-neuron 404, the firing of second pre-neuron 402B may take approximately 5 μs is to reach post-neuron 404, and the firing of third pre-neuron 402C may take approximately 2 μs to reach post-neuron 404.

To accurately model the firing of post-neuron 404 based on the simultaneous receipt of signals from pre-neurons 402, simulated neurons would need to have accuracy on the microsecond time scale. Although spike-timing models of simulated neurons attempt to accurately resolve the receipt of signals on the microsecond time scale, such short time-scale accuracies are difficult to achieve with modern computing equipment. To circumvent this computing difficulty, a mean firing rate model can be used. In a mean firing rate model, in an embodiment each simulated neuron roughly corresponds to approximately 100 real neurons, and the relative timing of when real neurons fire is roughly modeled by a single parameter: the phase of a simulated neuron. A mean firing rate model does not require microsecond time-scale accuracy. Embodiments of the present invention are described herein in terms of a mean firing rate model, although the invention is not limited to this example.

FIG. 2 illustrates a very simple example in which three simulated neurons 202A-C (referred to as pre-neurons) are connected to another simulated neuron 204 (referred to as a post-neuron). The activity and phase of a post-neuron (like simulated neuron 204) is dependent on the activity and the phase of each pre-neuron (like pre-neurons 202) connected to the post-neuron.

FIG. 23 is a flow chart illustrating an example method 2300 for setting an activity and phase of a post-neuron based on an activity and phase of one or more pre-neurons. Referring to FIG. 23, method 2300 begins at a step 2302 in which an activity distribution is determined based on activity-effecting contributions. Activity-effecting contributions come from activity-only connections (as illustrated in graph 302A of FIGS. 3A-C) and from activity-and-phase connections (as illustrated in graphs 302B and 302C of FIGS. 3A-C).

FIG. 3A graphically illustrates an implementation of step 2302 of method 2300. For example, FIG. 3A illustrates how the activity and phase of a post-neuron (like simulated neuron 204) depends on the activity and phase of pre-neurons (like simulated neurons 202) to which the post-neuron is connected. Referring to FIG. 3A, a first graph 302A represents the activity and phase of first simulated neuron 202A; a second graph 302B represents the activity and phase of second simulated neuron 202B; and a third graph 302C represents the activity and phase of third simulated neuron 202C. Fourth graph 302D represents a phase-only contribution that may come from a pre-neuron not illustrated in FIG. 2. The uniform distribution of first graph 302A is for a phase-independent input, and the distributions of graphs 302B and 302C are for phase-dependent inputs. (See Section II.B, infra, for a description of phase-independent and phase-dependent inputs.)

Graphs 302A, 302B, and 302C provide activity-effecting contributions to post-neuron 204. Graphs 302B, 302C, and 302D provide phase-effecting contributions to post-neuron 204. These concepts are described in greater detail below.

Determining the activity and phase of post-neuron 204, based on the activity-effecting contributions of pre-neurons 202, involves several steps. First, the activity-effecting contributions of pre-neurons 202 (e.g., activity-only contribution 302A and activity-and-phase contributions 302B, 302C) are summed together as represented by graph 320. Second, activities below an activity threshold are disregarded, as illustrated in graph 320. These activities are disregarded because only activities above the activity threshold can cause post-neuron 204 to become active.

Referring again to FIG. 23, in a step 2304 a phase distribution is determined based on phase-effecting contributions. FIG. 3B graphically illustrates an implementation of step 2304 of method 2300. Determining the phase of post-neuron 204, based on the phase-effecting contributions of pre-neurons 202, involves several steps. First, the phase-effecting contributions of pre-neurons 202 (e.g., activity-and-phase contributions 302B, 302C and phase-only contribution 302D) are summed together as represented by graph 330. Second, phases below a phase threshold are disregarded, as illustrated in graph 330.

Referring again to FIG. 23, in a step 2306 the activity and phase are set based on the activity and phase distributions. For example, as illustrated in FIG. 3C, a phase is selected from phase-based distribution 330. Several different algorithms for selecting the phase are described below. After the phase is selected from phase-based distribution 330, that phase is used to select a corresponding activity from graph 320, wherein the corresponding activity has the same phase as the phase selected from phase-based distribution 330. The activity and phase of post-neuron 204 is then determined to be the selected phase from phase-based distribution 330 and the corresponding activity from graph 330. The activity and phase of post-neuron 204 selected in this manner are represented, for example, by point 306 in graph 304.

Several different algorithms may be used for choosing a combination of an activity and phase on the curve of graph 304. As a first example, the activity and phase can be chosen at the maximum peak of the curve in graph 304. As a second example, the activity and phase can be chosen at the maximum peak of the curve in graph 304 plus or minus a predetermined offset. As a third example, a threshold activity value can be chosen and then an algorithm can step from left to right (or right to left) through each point on the curve until the threshold value is obtain. In this third example, the phase on the curve corresponding to that threshold value would be the phase chosen for the post-neuron. In a fourth example, the activity and phase can be chosen based on a normalization of the area under the curve in graph 304. In this fourth example, the area under the curve is normalized, and a random value between 0 and 1 is selected. The point on the curve where the normalized area under the curve equals the randomly selected value is then selected as the point for determining the activity and phase of the post-neuron. These four example methods are presented for illustrative purposes only, and not limitation. A person skilled in the relevant art(s) will appreciate that other methods for selecting the activity and phase of the post-neuron can be used without deviating from the spirit and scope of embodiments of the present invention.

B. Mathematics of Activity and Phase of Simulated Neurons

Subsection A provided an overview of how the activity and phase of a first simulated neuron (a post-neuron) is updated based on the activity and phase of other simulated neurons (pre-neuron(s)) connected to the first simulated neuron. This subsection provides mathematical details for computing such activities and phases.

In particular, the state of a simulated neuron (post-neuron) is updated as a function of its current state and contributions from inputs. The inputs may include, but are not limited to, voltage-independent inputs, voltage-dependent inputs, phase-independent inputs, and/or phase-dependent inputs. In an embodiment, voltage-independent inputs always contribute to the activity level provided to a post-neuron; voltage-dependent inputs contribute to the activity level provided to a post-neuron only if the voltage-independent inputs provided to the post-neuron exceed a threshold; and phase-independent inputs influence only the activity of a post-neuron, not the phase of the post-neuron (as illustrated, for example, by graph 302A of FIGS. 3A-C), whereas phase-dependent inputs influence only the phase of a post-neuron, not the activity of the post-neuron (as illustrated, for example, by graph 302D of FIGS. 3A-C). Voltage-independent inputs, voltage-dependent inputs, phase-independent inputs, and phase-dependent inputs are described in more detail below.

1. Voltage-Independent Inputs

The voltage-independent input to a simulated neuron i (post-neuron) from a single simulated neuron j (pre-neuron) is given by:

$$A_{ij}^{VI}(t) = c_{ij} s_j(t) \qquad \text{(Eq. 1)}$$

wherein $s_j(t)$ is the activity of simulated neuron j and $c_{ij}$ is the connection strength from simulated neuron j to simulated neuron i. As described in more detail in subsection D, the connection strength, $c_{ij}$, can change over time.

The total voltage-independent influence provided to the simulated neuron i (post-neuron) is then calculated by convolving the value of Equation 1 into a cosine-tuning curve over all phases and summing over the contribution from each simulated neuron j (pre-neuron):

$$POST_i^{VI} = \sum_{l=1}^{M} \sum_{j=1}^{N_l} \left( A_{ij}^{VI}(t) \sum_{k=1}^{N_{bin}} \left( \frac{\cos((2\pi/N_{bin})(k - p_j(t))) + 1}{2} \right)^{tw} \right) \quad \text{(Eq. 2)}$$

wherein M is the number of different anatomically defined connection types; $N_l$ is the number of connections of type M projecting from simulated neuron j (pre-neuron) to simulated neuron i (post-neuron); $p_j(t)$ is the phase of simulated neuron j at time t; $N_{bin}$ is the number of phase bins (e.g., 32); and tw is the tuning width, which can be adjusted to adjust the width of the cosine-tuning curve (e.g., the width of the curves depicted in graphs 302B and 302C of FIG. 3).

2. Voltage-Dependent Inputs

The voltage-dependent input to a simulated neuron i (post-neuron) from a single simulated neuron j (pre-neuron) is given by:

$$A_{ij}^{VD}(t) = \Phi(POST_i^{VI}(p_j(t)))c_{ij}s_j(t) \quad \text{(Eq. 3)}$$

wherein $$\Phi(x) = \begin{cases} 0; & x < \sigma_i^{vdep} \\ x; & \text{otherwise} \end{cases}$$

wherein $\sigma_i^{vdep}$ is a threshold for the activity of a post-neuron below which voltage-dependent connections have no effect.

The total voltage-dependent influence provided to simulated neuron i (post-neuron) is then computed by summing the contribution from each simulated neuron j (pre-neuron) connected to simulated neuron i (post-neuron), as given by:

$$POST_i^{VD} = \sum_{l=1}^{M} \sum_{j=1}^{N_l} \left( A_{ij}^{VD}(t) \sum_{k=1}^{N_{bin}} \left( \frac{\cos((2\pi/N_{bin})(k - p_j(t))) + 1}{2} \right)^{tw} \right) \quad \text{(Eq. 4)}$$

wherein, as in Equation 2, M is the number of different anatomically defined connection types; $N_l$ is the number of connections of type M projecting from simulated neuron j (pre-neuron) to simulated neuron i (post-neuron); $p_j(t)$ is the phase of simulated neuron j at time t; $N_{bin}$ is the number of phase bins (e.g., 32); and tw is the tuning width, which can be adjusted to adjust the width of the cosine-tuning curve (e.g., the width of the curves depicted in graphs 302B and 302C of FIG. 3)

3. Phase-Independent Inputs

The phase-independent input to a simulated neuron i (post-neuron) from a single simulated neuron j (pre-neuron) is given by:

$$A_{ij}^{PI}(t) = c_{ij}s(t) \quad \text{(Eq. 5)}$$

The total phase-independent influence provided to simulated neuron i (post-neuron) is a uniform distribution based on all phase-independent inputs divided by the number of phase bins, $N_{bin}$:

$$POST_i^{PI} = \sum_{l=1}^{M} \sum_{j=1}^{N_l} (A_{ij}^{PI}(t)) \quad \text{(Eq. 6)}$$

wherein M is the number of different anatomically defined connection types; $N_l$ is the number of connections of type M projecting from simulated neuron j (pre-neuron) to simulated neuron i (post-neuron); and $N_{bin}$ is the number of phase bins (e.g., 32).

4. Phase-Dependent Inputs

The phase-dependent input to a simulated neuron i (post-neuron) from a single simulated neuron j (pre-neuron) is given by:

$$A_{ij}^{PD}(t) = c_{ij}s_j(t) \quad \text{(Eq. 7)}$$

The total phase-dependent influence provided to the simulated neuron i (post-neuron) is then calculated by convolving the value of Equation 7 into a cosine-tuning curve over all phases and summing over the contribution from each simulated neuron j (pre-neuron):

$$POST_i^{PD} = \sum_{l=1}^{M} \sum_{j=1}^{N_l} \left( A_{ij}^{PD}(t) \sum_{k=1}^{N_{bin}} \left( \frac{\cos((2\pi/N_{bin})(k - p_j(t))) + 1}{2} \right)^{tw} \right) \quad \text{(Eq. 8)}$$

wherein M is the number of different anatomically defined connection types; $N_l$ is the number of connections of type M projecting from simulated neuron j (pre-neuron) to simulated neuron i (post-neuron); $p_j(t)$ is the phase of simulated neuron j at time t; $N_{bin}$ is the number of phase bins (e.g., 32); and tw is the tuning width, which can be adjusted to adjust the width of the cosine-tuning curve (e.g., the width of the curve depicted in graph 302D of FIGS. 3A-C).

After computing the voltage-independent inputs, the voltage-dependent inputs, the phase-dependent inputs, and the phase-independent inputs, a distribution of possible new phases and new activities for a post-neuron (such as post-neuron 204 of FIG. 2) is mathematically computed by linearly summing the contributions defined in Equations 2, 4, 6, and 8 (which results in a distribution similar to graph 304 of FIG. 3C):

$$POST_i = \sum_{j=1}^{N_{VI}} POST_j^{VI} \sum_{k=1}^{N_{VD}} POST_k^{VD} \sum_{l=1}^{N_{PI}} POST_l^{PI} \sum_{m=1}^{N_{PD}} POST_m^{PD} \quad \text{(Eq. 9)}$$

The new activity and phase of post-neuron i is selected at a point on the distribution (curve) computed in Equation 9, as described in detail above with respect to FIGS. 3A-C.

The new activity level may also be subjected to the following activation function:

$$s_i(t+1) = \phi(\tanh(g_i(POST_i(p_i(t+1)) + \omega_{s_i}(t))))$$ (Eq. 10)

wherein $$\phi(x) = \begin{cases} 0; & x < \sigma_i^{fire} \\ x; & \text{otherwise} \end{cases}$$

wherein $\omega_{s_i}$ determines the persistence of simulated-neuron activity from one simulation cycle to the next, $g_i$ is a scaling factor, and $\sigma_i^{fire}$ is a firing threshold specific to each simulated neuron.

C. Neural Groups and Connections

Simulated neurons may be organized into groups. For example, FIG. 5 illustrates a first group 510 of simulated neurons and a second group 520 of simulated neurons. First group 510 includes a total of m times n neurons positioned in a rectangular arrangement, with m neurons along a first (e.g., horizontal) direction and n neurons along a second (e.g., vertical) direction. Two simulated neurons of first group 510 are specifically illustrated in FIG. 5: simulated neuron 502 and simulated neuron 504. Similarly, second group 520 includes a total of k times l neurons positioned in a rectangular arrangement, with k neurons along a first (e.g., horizontal) direction and l neurons along a second (e.g., vertical direction). Two simulated neurons of second group 520 are specifically illustrated in FIG. 5: simulated neuron 522 and simulated neuron 524.

FIG. 5 also illustrates how simulated neurons from one neural group may be connected to simulated neurons from another neural group. For example, simulated neuron 502 of first group 510 is connected to both simulated neuron 522 and simulated neuron 524 of second group 520. Specifically, there is a topographic connection 501 from simulated neuron 502 (of first group 510) to simulated neuron 522 (of second group 520). A topographic connection is a connection between simulated neurons at the same relative position in each neural group. Referring again to FIG. 5, there is a non-topographic connection 503 from simulated neuron 502 (of first group 510) to simulated neuron 524 (of second group 520). A non-topographic connection connects simulated neurons that may or may not be at the same relative position in two different neural groups.

As illustrated in FIG. 5, the connections from simulated neuron 502 to simulated neuron 522 and simulated neuron 524 are excitatory, meaning that if simulated neuron 502 is active it may cause simulated neuron 522 and/or simulated neuron 524 to become active (in a similar manner to that described above with reference to FIG. 3). An excitatory connection has a positive weight. Excitatory connections are illustrated herein by an arrow from the pre-neuron (e.g., simulated neuron 502) to the post-neuron (e.g., simulated neuron 522 or simulated neuron 524).

A connection from a pre-neuron to a post-neuron may also be inhibitory, meaning that if the pre-neuron is active it may cause the post-neuron to be inactive. An inhibitory connection has a negative weight. Inhibitory connections are illustrated herein by a line from the pre-neuron to the post-neuron with a dot at the post-neuron (as illustrated, for example, by the connection between phase modulator 110 and simulated neurons 106 of FIG. 1).

Simulated neurons may be connected in other ways that are not specifically illustrated in FIG. 5. For example, simulated neurons of second group 520 may be connected to simulated neurons of first group 510. These connections can be either excitatory or inhibitory. As another example, each simulated neuron of first group 510 (second group 520) may be connected to itself or other simulated neurons in first group 510 (second group 520). Again, these connections can be either excitatory or inhibitory.

The simulated neurons of different neural groups may be configured for specific purposes. For example, FIG. 6 illustrates three different types of neural groups—an input neural group 602, a vertical-line neural group 620, and a horizontal-line neural group 630.

Input neural group 602 includes m times n total neurons, with m neurons along a first (e.g., horizontal) direction and n neurons along a second (e.g., vertical) direction. Simulated neurons of input neural group 602 are configured to become active in a similar manner to pixels on a screen. For example, pixels of a display device would be activated in such a way to display the lines of a box 604. In a similar manner, simulated neurons of input neural group 602 at the positions corresponding to the lines of box 604 become active in response to the input signal. Each simulated neuron of input neural group 602 is topographically connected to each simulated neuron of vertical-line neural group 620, as illustrated by arrow 601. Similarly, each simulated neuron of input neural group 602 is also topographically connected to each simulated neuron of horizontal-line neural group 630, as illustrated by arrow 603.

Like input neural group 602, vertical-line neural group 620 includes m times n total neurons, with m neurons along a first (e.g., horizontal) direction and n neurons along a second (e.g., vertical) direction. Unlike input neural group 602, however, each simulated neuron of vertical-line neural group 620 is configured to become activated in response to vertical lines. Thus, in the example of FIG. 6, the simulated neurons of vertical-line neural group 620 located at the position of the vertical lines of box 604 become active based on connection 601 from input neural group 602 to vertical-line neural group 620.

Like vertical-line neural group 620, horizontal-line neural group 630 also includes m times n total neurons, with m neurons along a first (e.g., horizontal) direction and n neurons along a second (e.g., vertical) direction. Each simulated neuron of horizontal-line neural group 630 is configured to become activated in response to horizontal lines. Thus, in the example of FIG. 6, the simulated neurons of horizontal-line neural group 630 located at the position of the horizontal lines of box 604 become active based on connection 603 from input neural group 602 to horizontal-line neural group 630.

In addition to these three types of neural groups described above, neural groups may be configured to respond to different characteristics of an input signal. For example, neural groups may be configured to respond to diagonal lines, colors, periodicity, distance, optical flow, signal intensity, signal onset/offset, or other types of characteristics of an input signal.

D. Mathematics of Connection Strength

As set forth above (see Section II.B, supra), the connection strength between simulated neurons is given by $c_{ij}$. As described in more detail below, this connection strength can change over time. The ability of the connection strength to change over time is referred to as synaptic plasticity. Changes in the connection strength may be value-independent or value-dependent. Both of these connection-strength changes are based on the Bienenstock-Cooper-Munro (BCM) Learning Rule. (See E. L. Bienenstock et al., *Theory for the Development of Neuron Selectivity: Orientation Specificity and*

*Binocular Interaction in Visual Cortex*, Journal of Neuroscience, 1982, at 32-48, the entirety of which is hereby incorporated by reference herein.)

1. Value-Independent Changes

Value-independent changes in the connection strength between simulated neurons is given by:

$$\Delta_{c_{ij}}(t+1) = \eta s_i(t) s_j(t) BCM(\Delta p) \quad \text{(Eq. 11)}$$

wherein $s_i$, (t) and $s_j$(t) are activities of post- and pre-neurons, respectively, $\eta$ is a fixed learning rate, BCM is the BCM learning rule, and $\Delta p$ is given by:

$$\Delta p = \frac{\cos((2\pi/N_{bin})(p_i(t) - p_j(t))) + 1}{2}$$

wherein $p_i(t)$ and $p_j(t)$ are the phases of post- and pre-neurons ($0 \leq \Delta p \leq 1$), and $N_{bin}$ is the number of phase bins (e.g., 32).

The BCM learning rule is given by:

$$BCM(\Delta p) = \begin{cases} 0; & \Delta p < \theta_1 \\ k_1(\theta_1 - \Delta p); & \theta_1 \leq \Delta p < (\theta_1 + \theta_2)/2 \\ k_1(\Delta p - \theta_2); & (\theta_1 + \theta_2)/2 \leq \Delta p < \theta_2 \\ k_2 \tanh(\rho(\Delta p - \theta_2))/\rho; & \text{otherwise} \end{cases} \quad \text{(Eq. 12)}$$

wherein $\theta_1$ and $\theta_2$ are thresholds used to define the piece-wise BCM learning rule, $k_1$ and $k_2$ are inclination functions, and $\rho$ is a saturation parameter.

2. Value-Dependent Changes

Value-dependent changes in the connection strength between simulated neurons is given by:

$$\Delta_{c_{ij}}(t+1) = \eta s_i(t) s_j(t) BCM(\Delta p) V(t) BCM_u(\Delta p_u) \quad \text{(Eq. 13)}$$

wherein $s_i(t)$ and $s_j(t)$ are activities of post- and pre-neurons, respectively; $\eta$ is a fixed learning rate; BCM is the BCM learning rule defined in Equation 12; V(t) is the mean activity level in the value area S at time t; $BCM_u$ is a modified BCM learning rule that uses the phase difference between area S and the phase of post-neuron i as input; and $\Delta p_u$ is given by:

$$\Delta p_v = \frac{\cos((2\pi/N_{bin})(p_v(t) - p_i(t))) + 1}{2}$$

wherein $p_u(t)$ is the mean phase in area S, $p_i(t)$ is the phase of post-neuron i; and $N_{bin}$ is the number of phase bins (e.g., 32).

With this description regarding simulated neurons, segmentation of an input signal in accordance with an embodiment of the present invention is now described in more detail.

III. External Modulation for Neural Segmentation of an Input Signal

FIG. 7 illustrates components of a brain-based device for segmenting neurons to identify entities included in an input signal 702 in accordance with an embodiment of the present invention. In the example of FIG. 7, input signal 702 comprises a video signal and includes an image of two different kinds of entities—a speedboat and a sailboat. The brain-based device illustrated in FIG. 7 includes simulated neurons 106, phase modulator 110, and entity-identifier module 108. Like brain-based device 100 described above with reference to FIG. 1 (which also included simulated neurons 106, phase modulator 110, and entity-identifier module 108), the brain-based device of FIG. 7 is configured to segment input signal 702 based on entities included in input signal 702.

FIG. 20 is a block diagram of an example method 2000 implemented by the brain-based device of FIG. 7. Example method 2000 begins at a step 2002 in which an input signal is received. For example, the brain-based device may receive signal 702, containing an image of a sailboat and an image of a speedboat.

In a step 2004, activities and phases of simulated neurons of the brain-based device are set. As described herein, the activity and phase of a first simulated neuron is set based on other simulated neurons coupled to the first simulated neuron.

In a step 2006, the phases of the simulated neurons are modulated based on modulation functions. For example, individual modulators of phase modulator 110 are configured to modulate the phases of simulated neurons 106, as described in more detail below.

In a step 2008, entities included in the input signal are identified. For example, brain-based device 700 is configured to identify the speedboat (as indicated by output neural group 750) and the sailboat (as indicated by output neural group 760) included in input signal 702.

Described in more detail below are the following topics: (A) an example neural anatomy of simulated neurons 106; (B) phase modulation performed by phase modulator 110; and (C) entity identification performed by entity-identifier module 108.

A. Example Neural Anatomy

Referring to FIG. 7, simulated neurons 106 include a plurality of neural groups: a distance neural group 720, a color neural group 730, and an edge neural group 740. As the names suggest, distance neural group 720 responds to the distance of objects from a camera that captured the image(s) provided in input video signal 702; color neural group 730 responds to the color of objects in input video signal 702; and edge neural group 740 responds to edges of objects included in input video signal 702.

As illustrated in FIG. 7, several connections exist among the neural groups. Referring to distance neural group 720, an excitatory self-connection exists between each simulated neuron and "near neighbors" of each respective simulated neuron, as illustrated by connection 721. Color neural group 730 and edge neural group 740 include similar excitatory self-connections, as illustrated by connection 731 and connection 741, respectively. Referring again to distance neural group 720, an inhibitory connection exists between each simulated neuron and "far neighbors" of each respective simulated neuron, as illustrated by connection 732. Color neural group 730 and edge neural group 740 include similar inhibitory self-connections, as illustrated by connection 732 and connection 742, respectively. The definition of a "near neighbor" and a "far neighbor" can be defined by an administrator based on specifications included in the network-description file.

In addition to the self-connections, simulated neurons of each neural group in the example anatomy of FIG. 7 are connected to the other neural groups. For example, each simulated neuron of distance neural group 720 is topographically connected to a corresponding simulated neuron of color neural group 730 and vice versa, as indicated by the bi-directional arrow 725. And, there is an inhibitory connection between simulated neurons of distance neural group 720 and simulated neurons of color neural group 730 that are topographically "far" from respective simulated neurons of distance neural group 720, and vice versa, as indicated by a bi-directional inhibitory connection 726. Simulated neurons of color neural group 730 have similar excitatory and inhibitory connections with simulated neurons of edge neural group 740, as indicated by connection 735 and connection 736, respectively. Also, simulated neurons of distance neural group 720 have similar excitatory and inhibitory connections with simulated neurons of edge neural group 740, but these connections are not illustrated in FIG. 7 for ease of representation.

It is to be appreciated that the anatomy of FIG. 7 is presented for illustrative purposes only, and not limitation. Other anatomies may be used within a brain-based device for segmenting an input signal without deviating from the spirit and scope of embodiments of the present invention. Indeed, other example anatomies, which may be included in simulated neurons 106, are set forth below in Sections VI and VII.

B. Phase Modulation

As set forth above, phase modulator 110 includes a plurality of individual modulators connected to each simulated neuron 106. Each individual modulator of phase modulator 110 is itself a type of simulated neuron that inhibits the activity and phase of each simulated neuron 106 according to a modulation function.

For example, FIG. 8A illustrates a plurality of individual modulators of phase modulator 110, including a first modulator 820A, a second modulator 820B, a k-th modulator 820k, and a N-th modulator 820N, wherein N is a natural number that is greater than or equal to 4, and k is a natural number that is greater than 2 and less than N. In an embodiment, N is equal to 32.

Each individual modulator 820 implements a modulation function. For example, FIG. 8B graphically illustrates an example modulation function 830 implemented by k-th modulator 820k. Specifically, modulation function 830 represents the activity of k-th modulator 820k as a function of time. When the activity of k-th modulator 820k is high, it causes the activity of each simulated neuron 106 to which it is connected to go low due to the inhibitory connection between phase modulator 110 and simulated neurons 106. Accordingly, k-th modulator 820k modules the activity of each simulated neuron 106. Each other individual modulator of phase modulator 110 implements a modulation function similar to k-th modulator 820k.

The modulation functions implemented by the individual modulators 820 of phase modulator 110 enable distinct collections of simulated neurons 106 to form, wherein each collection has substantially a single phase. Each distinct collection of simulated neurons 106 having substantially a single phase is representative of an entity included in input signal 702—such that, for example, a first collection of simulated neurons having substantially a first phase is representative of the speedboat included in input signal 702, and a second collection of simulated neurons having substantially a second phase is representative of the sailboat included in input 702. As described in more detail below (see Section III.C, infra), entity-identifier module 108 identifies each collection of simulated neurons 106 having substantially a single phase, and thereby identifies entities included in input signal 702.

The modulation function (i.e., activity as a function of time) of each individual modulator i of phase modulator 110 can be mathematically represented as follows:

$$s(i) = \begin{cases} \beta; & \beta > 0 \\ 0.0; & \beta \leq 0 \end{cases} \quad \text{(Eq. 14)}$$

wherein s(i) is the modulation function (i.e., activity as a function of time) of the i-th modulator and β is a temporary variable to store activity. In an embodiment, β is given by:

$$\beta(i) = \alpha \cos\left(\left(\frac{i}{\eta}\right)2\pi\theta\right) + \psi \quad \text{(Eq. 15)}$$

wherein η is the number of individual modulators in phase modulator 110 (which, in an embodiment, includes 32 individual modulators), θ is a parameter that sets the width of the cosine wave across phase modulator 110, ψ is an offset for the cosine function to shift it from being centered on the x-axis, and α is given by:

$$\alpha = \cos\left(\frac{rem\left(\frac{\kappa}{\tau}\right)}{\tau} * 2\pi\right) \quad \text{(Eq. 16)}$$

wherein κ is a positive increasing integer representing a current simulation cycle, τ is the number of simulation cycles to constitute one period for phase modulator 110, and rem(•) is a function that returns the remainder of a division of two numbers.

It is to be appreciated that the modulation function presented in Equations 14-16 is provided for illustrative purposes only, and not limitation. A person skilled in the relevant art(s) will appreciate that other modulation functions can be implemented by the individual modulators of phase modulator 110 to enable collections of simulated neurons to form, wherein each collection has substantially a single phase. These other modulation functions that enable such collections of simulated neurons to form are contemplated within the spirit and scope of embodiments of the present invention.

C. Entity Identification

As mentioned above, entity-identifier module 108 identifies entities included in input signal 702 based on distinct collections of simulated neurons 106 having substantially distinct phases. Described in more detail below is (i) a first embodiment in which entity-identifier module 108 identifies the entities using a histogram and (ii) a second embodiment in which entity-identifier module 108 comprises a selection-cell anatomy configured to identify the entities. It is to be appreciated, however, that these embodiments are presented for illustrative purposes only, and not limitation.

1. Histogram Embodiment

FIG. 21 is a block diagram of an example method 2100 for identifying entities using a histogram in accordance with an embodiment of the present invention. Referring to FIG. 21, method 2100 begins at a step 2102 in which phases of simulated neurons 106 are collected.

In a step 2104, the phases are placed in bins of a histogram. For example, FIG. 9 illustrates an example histogram 900 used by entity-identifier module 108 to identify entities in input signal 702 in accordance with an embodiment of the present invention. Referring to FIG. 9, the phases from each simulated neuron 106 is placed in one of a plurality of phase bins of histogram 900 (which in the example of FIG. 9 includes seven phase bins, but could include fewer or more phase bins as would be understood by a person skilled in the relevant art(s)).

In a step 2106, one or more entities included in the input signal are identified (i.e., distinguished) based on the phase bins of the histogram. This type of identification can be accomplished in one of several example ways. In a first example, entities can be identified according to the largest phase bins. In this example, a threshold is typically established. If the number of simulated neurons 106 falling in a particular phase bin exceeds the threshold, entity-identifier module 108 identifies the simulated neurons 106 in that particular phase bin as representing an entity in input signal 702. Accordingly, for the example of FIG. 9, entity-identifier module 108 would identify two entities included in input signal 702: (i) a first entity represented by the simulated neurons having phases that fall in phase bin 905; and (ii) a second entity represented by the simulated neurons having phases that fall in phase bin 907. No other entities would be identified because each other phase bin does not exceed the threshold.

In a second example, an algorithm can be used to identify phase bins that include simulated neurons corresponding to an entity included in the input signal. Several different types of algorithms may be used for selecting bins of the histogram, as would be understood by persons skilled in the relevant art(s). For example, the algorithm may identify the phase bins based on the shape of contiguous bins in the histogram. However, other types of algorithms for identifying phase bins may be used without deviating from the spirit and scope of the present invention.

2. Selection-Cell Anatomy Embodiment

FIG. 10 illustrates an example selection-cell anatomy 1000 configured to identify at most two distinct entities included in input signal 702 in accordance with another embodiment of the present invention. A selection-cell anatomy can be configured to identify greater than two distinct entities included in an input signal, as will become apparent from the description contained below.

Selection-cell anatomy 1000 comprises a plurality of simulated neurons that are organized and connected in a specific manner to enable selection-cell anatomy 1000 to identify distinct subsets of phases, and thereby identify entities included in input signal 702. First, the example anatomy depicted in FIG. 10 is described. Then, the operation of this anatomy is described.

Referring to FIG. 10, selection-cell anatomy 1000 includes four groups of simulated neurons: (i) a first selector group 1010; (ii) a second selector group 1020; (iii) a first inhibitor group 1012; and (iv) a second inhibitor group 1022. First selector group 1010 and second selector group 1020 are connected to each simulated neuron 106. In the example of FIG. 7, simulated neurons 106 include three different groups of neurons: distance group 720, color group 730, and edge group 740. Accordingly, in the example of FIG. 10, first selector group 1010 and second selector group 1020 are connected to each of distance group 720, color group 730, and edge group 740. Specifically, referring to FIG. 10, distance group 720 is connected to first selector group 1010 by an excitatory connection 1001 and to second selector group 1020 by an excitatory connection 1002; color group 730 is connected to first selector group 1010 by an excitatory connection 1003 and to second selector group 1020 by an excitatory connection 1004; and edge group 740 is connected to first selector group 1010 by an excitatory connection 1005 and to second selector group 1020 by an excitatory connection 1006.

In addition to the connections to simulated neurons 106, first selector group 1010 and second selector group 1020 have excitatory self-connections. Specifically, first selector group 1010 has a phase-only self-connection 1011, and second selector group 1020 has a phase-only self-connection 1021. Additionally, first selector group 1010 has an excitatory connection 1013 to first inhibitor group 1012, and second selector group 1020 has an excitatory connection 1023 to second inhibitor group 1022. First inhibitor group 1012 has an inhibitory connection 1015 to second selector group 1020, and second inhibitor group 1022 has an inhibitory connection 1025 to first selector group 1010.

In operation, first selector group 1010 tends to become active in response to a first collection of simulated neurons of distance group 720, color group 730, and edge group 740 which have substantially a first phase based on the topographic connections 1001, 1003, and 1005, respectively. First inhibitor group 1012 also becomes active in response to the first collection of simulated neurons based on excitatory connection 1013 and, in addition, inhibits second selector group 1020 from becoming active in response to the first collection of simulated neurons based on inhibitory connection 1015. Accordingly, the combination of first selector group 1010 and first inhibitor group 1012 does two things: it enables first selector group 1010 to cue onto the first collection of simulated neurons having substantially the first phase and inhibits second selector group 1020 from cuing onto the first collection of simulated neurons.

In a similar manner to that described above, second selector group 1020 tends to become active in response to a second collection of simulated neurons of distance group 720, color group 730, and edge group 740 which have substantially a second phase based on the topographic connections 1002, 1004, and 1006, respectively. Second inhibitor group 1022 also becomes active in response to the second collection of simulated neurons based on excitatory connection 1023 and, in addition, inhibits first selector group 1010 from becoming active in response to the second collection of simulated neurons based on inhibitory connection 1025. Accordingly, the combination of second selector group 1020 and second inhibitor group 1022 does two things: it enables second selector group 1020 to cue onto the second collection of simulated neurons having substantially the second phase and inhibits first selector group 1010 from cuing onto the second collection of simulated neurons.

Thus, first selector group 1010 and first inhibitor group 1012 work collectively to select a first collection of simulated neurons having substantially a first phase, wherein the first collection is representative of a first entity in input signal 702. Similarly, second selector group 1020 and second inhibitor group 1022 work collectively to select a second collection of simulated neurons having substantially a second phase, wherein the second collection is representative of a second entity in input signal 702. Accordingly, selection-cell anatomy 1000 is configured to identify only two distinct entities in input signal 702.

A selection-cell anatomy can be configured to identify more than two distinct entities included in input signal 702 by including additional pairs of selector groups and an inhibitor groups with connections similar to the ones depicted in FIG. 10. For each additional pair of selector group and inhibitor group, the selection-cell anatomy would be configured to identify an additional distinct entity included in input signal 702.

* * *

Regardless of whether a histogram method, a selection-cell anatomy, or some other method is used, entity-identifier module 108 identifies distinct collections of simulated neurons 106 having substantially distinct phases. These distinct collections of simulated neurons 106, which correspond to distinct entities included in input signal 702, may be output to output neural groups, as illustrated in FIGS. 11 and 12.

In the example of FIG. 11, an output neural group 750 comprises a first collection of simulated neurons having substantially a first phase, wherein the first collection is representative of the speedboat included in input signal 702. If, for example, entity-identifier module 108 used the histogram method to identify entities included in input signal 702, then the simulated neurons falling within phase bin 905 (see FIG. 9) may be included in output neural group 750. If, on the other hand, entity-identifier module 108 comprises a selection-cell anatomy, then the simulated neurons identified by first selector group 1010 may be included in output neural group 750. Thus, in either case, entity-identifier module 108 identifies the speedboat included in input signal 702.

In the example of FIG. 12, an output neural group 760 comprises a second collection of simulated neurons having substantially a second phase, wherein the second collection is representative of the sailboat included in input signal 702. If entity-identifier module 108 used the histogram method, for example, to identify entities included in input signal 702, then the simulated neurons falling within phase bin 907 (see FIG. 9) may be included in output neural group 760. If, on the other hand, entity-identifier module 108 comprises a selection-cell anatomy, then the simulated neurons identified by second selector group 1020 may be included in output neural group 760. Thus, in either case, entity-identifier module 108 identifies the sailboat included in input signal 702.

IV. Example System for Neural Simulation

FIG. 13 illustrates an example system 1300 for implementing a neural simulation to segment content of an input signal in accordance with an embodiment of the present invention. System 1300 includes hardware components that may be used to implement a brain-based device (such as, brain-based device 100 of FIG. 1 or brain-based device 700 of FIG. 7). Referring to FIG. 13, system 1300 includes a general-purpose computer 1304, a remote device (display) 1306, a secondary memory 1310, and a data-parallel processing unit 1308.

General-purpose computer 1304 performs input/output functions of system 1300. To perform these functions, general-purpose computer 1304 comprises typical components of a general-purpose computer—such as, for example, a memory and general-purpose processor. General-purpose computer 1304 is coupled to remote device (display) 1306, data-parallel processing unit 1308, and secondary memory 1310. An input signal 1302 (e.g., a video signal, audio signal, or some other input signal) is provided to general-purpose computer 1304.

Remote device (display) 1306 enables an administrator to interact with system 1300. Remote device 1306 may simply comprise a monitor and keyboard to enable a user to interact with general-purpose computer 1304. Alternatively, remote device 1306 may comprise a computing device (e.g., laptop computer, desktop computer, hand-held device, or the like) that is coupled to general-purpose computer 1304 via a network connection (e.g., a local area network (LAN) connection, an Internet connection, or the like). Remote device 1306 may be used by an administrator to set up a neural simulation. For example, the administrator may provide a network-description file or other inputs as described in more detail below. Additionally, remote device 1306 enables an administrator to monitor the progress of a neural simulation that may run on system 1300. For example, if input signal 1302 is a video signal, general-purpose computer 1304 may cause input signal 1302 to be displayed on remote device 1306 to enable an administrator to evaluate whether system 1300 is properly functioning to identify entities (e.g., objects) included in the video signal. As another example, if input signal 1302 is an audio signal, general-purpose computer 1304 may cause input signal 1302 to be played on remote device 1306 to enable an administrator to evaluate whether system 1300 is properly functioning to identify entities (e.g., sound sources) included in audio signal.

Secondary memory 1310 stores algorithms (e.g., neural simulations) to be executed by system 1300 and also stores instances of simulated neural (which, as described in more detail below, may be stored as memory arrays). Secondary memory 1310 may comprise, for example, a hard disk drive or a removable storage drive (e.g., floppy disk drive, magnetic tape drive, an optical disk drive, a flash drive, etc.).

Data-parallel processing unit 1308 performs computations to implement a neural simulation in accordance with an embodiment of the present invention. In an embodiment, data-parallel processing unit 1308 comprises one or more off-the-shelf graphics processing units (GPUs)—such as, for example, three general-purpose GPUs provided by NVIDIA Corporation of Santa Clara, Calif. ("NVIDIA"). In another embodiment, data-parallel processing unit 1308 comprises one or more custom-made processing units, specifically configured to process neural-simulation data.

Data-parallel processing unit 1308 is connected to general-purpose computer 1304. The connection between data-parallel processing unit 1308 and general-purpose computer 1304 may comprise a peripheral component interconnect (PCI), a PCI express (PCIe), or some other type of connection. Data-parallel processing unit 1308 communicates with general-purpose computer 1304 via an application-programming interface (API). The API allows an administrator to program data-parallel processing unit 1308 to perform functions of a neural simulation in accordance with an embodiment of the present invention. If data-parallel processing unit 1308 comprises a custom-made processing unit, then a custom-made API is used. If, on the other hand, data-parallel processing unit 1308 comprises one or more off-the-shelf GPUs, then either a custom-made or commercially available API can be used. Several types of commercially available APIs for programming off-the-shelf GPUs currently exist—including, for example, DirectX® developed by Microsoft Corporation of Redmond, Wash.; OpenGL® developed by Silicon Graphics, Inc. of Sunnyvale, Calif.; and Compute Unified Device Architecture (CUDA) developed by NVIDIA. For commercially available APIs, the API typically communicates with a driver. The driver translates standard code received from the API into a native format of instructions understood by the off-the-shelf GPU. The driver is typically written by the manufacturer of the off-the-shelf GPU. The GPU then executes the instructions from the driver.

V. Example Operation of Neural Simulation

FIG. 14 illustrates steps of an example neural simulation 1400 performed by a brain-based device (e.g., brain-based device 100 of FIG. 1 or brain-based device 700 of FIG. 7) in accordance with an embodiment of the present invention. Neural simulation 1400 may be implemented, for example, on the hardware components of system 1300 of FIG. 13 as explained in greater detail below.

Referring to FIG. 14, neural simulation 1400 begins at a step 1402 in which a main function is called. The algorithm used to implement neural simulation 1400 may be stored, for example, in secondary memory 1310 of system 1300. Calling the main function, as illustrated in step 1402, may load this algorithm (or a portion thereof) into the local memory of general-purpose computer 1304 in preparation for the execution of neural simulation 1400.

In a step 1404, neural simulation 1400 is initialized based on groups and projections defined in a network-description file 1406. A group defines a collection of simulated neurons. A projection defines how simulated neurons are to be connected.

As set forth above, three example neural groups are depicted in FIG. 7: (i) distance group 720; (ii) color group 730; and (iii) edge group 740. Table 1 illustrates a portion of a network-description file that defines a neural group, labeled "V2 Groups."

TABLE 1

| Name V2 Groups | Height | Width | Firing Threshold | Phase Threshold | Voltage Dependent Threshold | Persistence |
|---|---|---|---|---|---|---|
| V2_Color0 | 60 | 80 | 0 | 0.9 | 0.02 | 0 |
| V2_Color1 | 60 | 80 | 0 | 0.9 | 0.02 | 0 |
| V2_Color2 | 60 | 80 | 0 | 0.9 | 0.02 | 0 |
| V2_Color3 | 60 | 80 | 0 | 0.9 | 0.02 | 0 |
| V2_Color4 | 60 | 80 | 0 | 0.9 | 0.02 | 0 |
| V2_Color5 | 60 | 80 | 0 | 0.9 | 0.02 | 0 |
| V2_Color6 | 60 | 80 | 0 | 0.9 | 0.02 | 0 |
| V2_Color7 | 60 | 80 | 0 | 0.9 | 0.02 | 0 |
| V2_Color8 | 60 | 80 | 0 | 0.9 | 0.02 | 0 |
| V2_Color9 | 60 | 80 | 0 | 0.9 | 0.02 | 0 |
| V2_Color0_I | 1 | 1 | 0.5 | 0 | 0 | 0 |
| V2_Color1_I | 1 | 1 | 0.5 | 0 | 0 | 0 |
| V2_Color2_I | 1 | 1 | 0.5 | 0 | 0 | 0 |
| V2_Color3_I | 1 | 1 | 0.5 | 0 | 0 | 0 |
| V2_Color4_I | 1 | 1 | 0.5 | 0 | 0 | 0 |
| V2_Color5_I | 1 | 1 | 0.5 | 0 | 0 | 0 |
| V2_Color6_I | 1 | 1 | 0.5 | 0 | 0 | 0 |
| V2_Color7_I | 1 | 1 | 0.5 | 0 | 0 | 0 |
| V2_Color8_I | 1 | 1 | 0.5 | 0 | 0 | 0 |
| V2_Color9_I | 1 | 1 | 0.5 | 0 | 0 | 0 |

Network-description file 1406 specifies features of each group of simulated neurons. These features are implemented during the initialization of step 1406. As illustrated in Table 1, network-description file 1406 may specify, for example, the following features of each group:

Height—the number of simulated neurons included in the neural group along a first (e.g., vertical) dimension;

Width—the number of simulated neurons included in the neural group along a second (e.g., horizontal) dimension;

Firing threshold—an overall activity level that must be received by a simulated neuron in order to cause the simulated neuron to become active;

Phase threshold—an activity level that must be received by a simulated neuron in order to cause the simulated neuron to choose a phase; otherwise, the phase is set randomly;

Voltage-dependent threshold—an activity level that must be collectively provided by all voltage-independent inputs to a simulated neuron in order for voltage-dependent inputs to contribute to the activity of the simulated neuron; and Persistence—a duration over which a simulated neuron remains active.

It is to be appreciated that these features are presented for illustrative purpose only, and not limitation. Other features of a neural group may be specified in network-description file 1406.

In addition to neural groups, network-description file 1406 specifies projections between neural groups. The projections define how the simulated neurons of the different neural groups will connect to each other during the initialization of step 1404. Table 2 illustrates a portion of a network-description file that defines connections between simulated neurons of different neural groups. As illustrated in Table 2, network-description file 1406 may specify, for example, the following features of each projection:

from neural group—the simulated group of neurons from which a connection emanates;

to neural group—the simulated group of neurons to which a connection is made;

probability—the probability that a connection will be created between a from neuron and a to neuron during initialization;

influence—a weighting factor for a particular connection;

maximum initial weight—the maximum initial weight between a from neuron and a to neuron;

minimum initial weight—the minimum initial weight between a from neuron to a to neuron;

connection type—the type of connection (e.g., voltage-dependent or voltage-independent) between a from neuron and a to neuron;

phase-dependent—the phase-dependency of a connection (e.g., phase-independent or phase-dependent)

learning rule—the transfer function between a from neuron and a to neuron; and learning rate—a parameter that governs how quickly a connection strength between a from neuron and a to neuron can change over time.

It is to be appreciated that the features of neural projections presented in Table 2 are presented for illustrative purposes only, and not limitation. Other features of neural projections may be included in network-description file 1406.

TABLE 2

| From | To | Probability | Maximum Initial Weights | Connection Type | Learning Rule | Learning Rate |
|---|---|---|---|---|---|---|
| V1 −> V2 | | | | | | |
| Ver | V2_Ver | 0.5 | 2.5 | 0 | 0 | 0 |
| Hor | V2_Hor | 0.5 | 2.5 | 0 | 0 | 0 |
| Pos | V2_Pos | 0.5 | 2.5 | 0 | 0 | 0 |
| Neg | V2_Neg | 0.5 | 2.5 | 0 | 0 | 0 |
| V1 −> V2 Inhibition | | | | | | |
| Ver | V2_Ver_I | 0.1 | 1 | 0 | 0 | 0 |
| Hor | V2_Hor_I | 0.1 | 1 | 0 | 0 | 0 |
| Pos | V2_Pos_I | 0.1 | 1 | 0 | 0 | 0 |
| Neg | V2_Neg_I | 0.1 | 1 | 0 | 0 | 0 |
| V2_Ver_I | V2_Ver | 1 | −1 | 0 | 0 | 0 |
| V2_Hor_I | V2_Hor | 1 | −1 | 0 | 0 | 0 |
| V2_Pos_I | V2_Pos | 1 | −1 | 0 | 0 | 0 |
| V2_Neg_I | V2_Neg | 1 | −1 | 0 | 0 | 0 |

Referring again to FIG. 14, after the initialization step 1404 is performed, inputs to simulation 1400 are obtained, as illustrated in a step 1408. The inputs refer to the activity and phase of each simulated neuron used in a neural simulation. Initially, the activity and phase of simulated neurons is set based on an input signal. For example, in brain-based device 700 of FIG. 7, the initial activity and phase of simulated neurons 106 is set based on input signal 702. In an embodiment, the I/O functions required to get the inputs of step 1408 are performed by general-purpose computer 1304. For example, get-inputs step 1408 may be performed by general-purpose computer 1304 when it receives an input signal (such as, input signal 702 of FIG. 7) and provides the input signal to data-parallel processing unit 1308.

In a step 1410, neural updates are computed. That is, a new activity and phase are computed for each simulated neuron. The new activity and phase of a first simulated neuron is based on the activities and phases of other simulated neurons connected to the first simulated neuron—as pictorially described above with respect to FIGS. 3A-C and mathematically described in detail above with respect to Equations 1-10. In an embodiment, the neural updates of step 1410 are computed by data-parallel processing unit 1308.

In a step 1412, results of the neural updates are obtained. For example, general-purpose computer 1304 may obtain the results of the neural updates performed by data-parallel processing unit 1308 during step 1410.

After step 1412, neural simulation 1400 may loop back to step 1408. Steps 1408, 1410, and 1412 represent one simulation cycle of neural simulation 1400. As described in detail above, distinct collections of simulated neurons having substantially distinct phases may form after a number of simulation cycles, wherein each distinct collection of simulated neurons corresponds to distinct entities included in an input signal. These distinct collections of simulated neurons may be represented on remote device 1306 of FIG. 13. For example, each distinct collection of simulated neurons may be represented in an output neural group, such as output neural groups 750 or 760 of FIG. 7.

VI. Function-Specific Anatomies

As set forth above, simulated neurons 106 may be organized in a plurality of different anatomies. In embodiments, simulated neurons 106 may include one or more function-specific anatomies, each configured to perform a specific function.

A. Selection-Cell Anatomy

FIG. 10 illustrates an example selection-cell anatomy configured to select collections of simulated neurons having substantially distinct phases. In the example of FIG. 10, the selection-cell anatomy is configured to identify only two distinct collections of simulated neurons, wherein a first collection has substantially a first phase and a second collection has substantially a second phase. However, as described above, a selection-cell anatomy in accordance with an embodiment of the present invention can be configured to identify more than two distinct collections of simulated neurons by including additional pairs of selector groups and inhibitor groups. In addition, in the example of FIG. 10, the selection-cell anatomy is coupled to specific neural groups—namely, distance group 720, color group 730, and edge group 740. It is to be appreciated, however, that a selection-cell anatomy in accordance with an embodiment of the present invention may be coupled to other types of simulated neurons and neural groups without deviating from the spirit and scope of the present invention.

FIG. 24 provides an example flow chart 2400, illustrating the functionality of a selection-cell anatomy in accordance with an embodiment of the present invention. Flow chart 2400 begins at a step 2402 in which simulated neurons of each selector group are set—i.e., the activity and phase of each simulated neuron in each selector group is determined. For example, in step 2402, the simulated neurons of first selector 1010 and second selector 1020 of selection-cell anatomy 1000 (FIG. 10) may be set. In an embodiment, the activity and phase of the simulated neurons in each selector group is determined by data-parallel processing unit(s) 1308 of system 1300.

In a step 2404, the phases of the simulated neurons of each selector group are read. For example, the simulated neurons of first selector 1010 and second selector 1020 of selection-cell anatomy 1000 (FIG. 10) may be read. In an embodiment, general-purpose computer 1304 may read the phases of the simulated neurons from data computed by data-parallel processing unit(s) 1308. The phases may or may not be displayed on remote device 1306.

In a step 2406, it is determined whether any of the selector groups of a selection-cell anatomy has sufficient activity and phase. A sufficient activity would occur, for example, if active neurons in a selector group have an activity level above a predetermined threshold. A sufficient phase would occur, for example, if a predetermined percentage (e.g., majority) of active neurons in the selector group have substantially the same phase. It is to be appreciated, however, that other methods for determining whether the activity and phase of a selector group has attained a sufficient level may be used without deviating from the spirit and scope of the present invention. In an embodiment, data-parallel processing unit(s) 1308 implements step 2406. In another embodiment, general-purpose computer 1304 implements step 2406.

If in step 2406 it is determined that the activity and phase of a given selector group has not attained a sufficient level, then flow returns to step 2402. If, on the other hand, it is determined that the activity and phase of a given selector group has attained a sufficient level, then the simulated neurons of the given selector are provided to an output neural group, as illustrated in step 2408. In an embodiment, general-purpose computer 1304 may provide the output neural group for display on remote device 1306.

B. Inhibitory Anatomy

FIG. 15 illustrates an example inhibitory anatomy 1500 that is configured to inhibit an undesirable portion of an input signal in accordance with an embodiment of the present invention. In the example of FIG. 15, inhibitory anatomy 1500 is specifically configured to inhibit noise in an audio input signal. It is to be appreciated, however, that this is for illustrative purposes only, and not limitation. An inhibitory anatomy of an embodiment of the present invention may be configured to inhibit other undesirable characteristics of input signals as will be apparent to a person skilled in the relevant art(s) from the description contained herein.

Referring to FIG. 15, inhibitory anatomy 1500 includes three different groups of simulated neurons: (i) an input group 1502; (ii) an inhibitory group 1504; and (iii) an output group 1506. Input group 1502 and output group 1506 each include m neurons along a first (e.g., horizontal) direction and n neurons along a second (e.g., vertical) direction. Like input group 1502 and output group 1506, inhibitory group 1504 includes m neurons along the first direction, but includes only one neuron along the second direction.

Input group 1502 has a non-topographical connection 1501 to inhibitory group 1504. Specifically, each of the n neurons in each column of simulated neurons of input group 1502 is connected to the one neuron in the corresponding column of inhibitory group 1504. For example, each of the n neurons in the first column of input group 1502 is connected to the neuron in the first column of inhibitory group 1504; each of the n neurons in the second column of input group 1502 is connected to the neuron in the second column of inhibitory group 1504; and so on. Non-topographic connection 1501 is excitatory.

Input group 1502 has a topographic connection 1503 to output group 1506. Specifically, topographic connection 1503 connects each simulated neuron of input group 1502 to a corresponding simulated neuron of output group 1506, wherein a first simulated neuron of output group 1506 is a corresponding simulated neuron to a second simulated neuron of input group 1502 if the first simulated neuron is at the same relative position with respect to output group 1506 as the second simulated neuron is with respect to input group 1502. Topographic connection 1503 is excitatory.

Inhibitory group 1504 has a connection 1505 to output group 1506. Specifically, each neuron of inhibitory group 1504 is connected to the n neurons in a corresponding column of output group 1506. For example, the simulated neuron in the first column of inhibitory group 1504 is connected to each of the n simulated neurons in the first column of output group 1506; the simulated neuron in the second column of inhibitory group 1504 is connected to each of the n simulated neurons in the second column of output group 1506; and so on. Connection 1505 is inhibitory.

In operation, input group 1502 receives an input signal. The simulated neurons of input group 1502 respond to the input signal. That is, the activity and phase of simulated neurons in input group 1502 are set in response to the input signal. Specifically, in the example of FIG. 15, simulated neurons of input group 1502 respond to a signal A, a signal B, and noise included in the input audio signal.

Like the simulated neurons of input group 1502, simulated neurons of output group 1506 are also activated in response to signal A and signal B, due to topographic connection 1503 from input group 1502 to output group 1506. However, unlike the simulated neurons of input group 1502, simulated neurons of output group 1506 do not tend to become activated in response to the noise included the input signal, due to inhibitory connection 1505 from inhibitory group 1504 to output group 1506.

Importantly, the persistence of inhibitory connection 1505 is configured to inhibit the simulated neurons of output group 1506 from becoming activated in response to the noise. Accordingly, characteristics of inhibitory anatomy 1500 that enable it to inhibit an undesirable portion of an input signal include not only the anatomy, but also the value of the persistence of inhibitory connection 1505.

VII. Dynamic Anatomies

In addition to the function-specific anatomies described above, embodiments of the present invention may include dynamic anatomies. In typical anatomies, only the connection strength between simulated neurons changes during a neural simulation. In a dynamic anatomy, not only can the connection strengths change during a neural simulation, but also the connections themselves. In a first dynamic-anatomy embodiment, connections between simulated neurons can be repurposed. In a second dynamic-anatomy embodiment, connections between simulated neurons can be created. In a third dynamic-anatomy embodiment, connections between simulated neurons can be destroyed. These embodiments are presented for illustrative purposes only, and not limitation.

A. Reconnecting/Repurposing Anatomies

FIGS. 16A and 16B collectively illustrate an example dynamic anatomy in which connections between simulated neurons are repurposed in accordance with an embodiment of the present invention.

FIG. 16A illustrates initial neural connections between a neural group A 1602 and a neural group B 1604. Specifically, a first connection 1611 connects a first simulated neuron 1610 of neural group A 1602 to simulated neurons of neural group B 1604; a second connection 1613 connects a second simulated neuron 1612 of neural group A 1602 to simulated neurons of neural group B 1604; and a third connection 1615 connects a third simulated neuron 1614 of neural group A 1602 to simulated neurons of neural group B 1604. Connections 1611, 1613, and 1615 can be any type of neural connection (e.g., excitatory, inhibitory, topographic, non-topographic, etc.).

Connections 1611, 1613, and 1615 may be shuffled (repurposed) according to an example method 2200 illustrated in FIG. 22. Referring to FIG. 22, method 2200 begins at a step 2202 in which a repurposing condition is set. The repurposing condition is established by an administrator of a brain-based device. For example, simulated neurons 1610, 1612, and 1614 may be configured to cause simulated neurons of neural group B 1604 to become active, but only on the condition that each of simulated neurons 1610, 1612, and 1614 is active during the same simulation cycle. Other repurposing conditions may be used as would be apparent to a person skilled in the relevant art(s) from reading the description contained herein.

In step 2204, it is determined whether the repurposing condition is satisfied. If the condition is satisfied, method 2200 proceeds to a step 2206 in which the connections are maintained. If, on the other hand, the repurposing condition is not satisfied after a predetermined number of simulation cycles, method 2200 proceeds to a step 2208 in which the connections are shuffled. For example, connections from neural group A 1602 to neural group B 1604 can be reshuffled. If, in accordance with the example above, simulated neurons 1610, 1612, and 1614 do not become active during the same simulation cycle, connections 1611, 1613, and 1615 from neural group A 1602 to neural group B 1604 can be shuffled (repurposed).

The connection between simulated neurons may be reshuffled in one of several different ways. In a first example, the connections may be randomly (or pseudo-randomly) reshuffled. In a second example, connections may be made to simulated neurons according to projections of those simulated neurons specified in the network-description file. A further example makes connections as specified in the second example above, but only connects to simulated neurons that were previously active or previously active above a threshold.

FIG. 16B illustrates the shuffling (repurposing) of connections from neural group A 1602 to neural group B 1604. Referring to FIG. 16B, a fourth connection 1621 connects a fourth simulated neuron 1620 of neural group A 1602 (rather than first simulated neuron 1610) to neural group B 1604; a fifth connection 1623 connects a fifth simulated neuron 1622 of neural group A 1602 (rather than second simulated neuron 1612) to neural group B 1604; and a sixth connection 1625 connects a sixth simulated neuron 1624 of neural group A 1602 (rather than third simulated neuron 1614) to neural group B 1604.

If connections 1621, 1623, and 1625 result in the satisfaction of the predetermined condition after the predetermined number of simulation cycles, then these connections will remain intact. If, on the other hand, connections 1621, 1623, and 1625 do not satisfy the predetermined condition after the predetermined number of simulation cycles, then these connections can be shuffled in the same way that connections 1611, 1613, and 1615 were shuffled.

Several different algorithms may be used to shuffle connections if the predetermined condition is not satisfied after the predetermined number of simulation cycles. Such algorithms include, but are not limited to, random (pseudo-random) shuffling, shuffling based on learned behavior of a brained-based device, an average over previous connections, or another algorithm used to shuffle the connections.

Repurposing connections has several potential advantages. First, repurposing connections enables a brain-based device to be configured with fewer simulated neurons compared to a brain-based device that does not support the repurposing of connections. Second, with fewer simulated neurons, the updated states of the simulated neurons of a brain-based device that enables repurposing of connections can be computed more quickly than a conventional brain-based device that does not enable repurposing of connections. That is, the computation of the updated state of a simulated neuron takes time. The greater the number of simulated neurons, the more time (or processing power) needed to compute the updated states of the simulated neurons. Because repurposing connections enables fewer simulated neurons to be used, the updated states of the simulated neurons can be computed more quickly. Third, with fewer simulated neurons, a brain-based device that enables repurposing of connections can learn more quickly than a conventional brain-based device that does not enable repurposing of connections.

B. Creation-Type Dynamic Anatomy

FIGS. 17A and 17B collectively illustrate an example dynamic anatomy in which a new simulated neuron is created in accordance with an embodiment of the present invention.

Referring to FIG. 17A, a memory array 1700 comprises a plurality of simulated neurons—including a first simulated neuron 1701, a second simulated neuron 1702, a third simulated neuron 1703, a fourth simulated neuron 1704, and a fifth simulated neuron 1705. In the example of FIG. 17A, first simulated neuron 1701 and second simulated neuron 1702 are trained to respond to specific stimuli. For example, first simulated neuron 1701 has been trained to respond to the letter A—meaning that if the letter A is included in an input signal, first simulated neuron 1701 will be activated. In a similar manner, second simulated neuron 1702 has been trained to respond to the letter B—meaning that if the letter B is included in the input signal, second simulated neuron 1702 will be activated. As illustrated in FIG. 17A, memory array 1700 includes three simulated neurons that are untrained: third simulated neuron 1703, fourth simulated neuron 1704, and fifth simulated neuron 1705. These currently untrained simulated neurons are free to be trained during the course of a neural simulation.

For example, FIG. 17B illustrates a modified memory array 1700' in which fifth simulated neuron 1705 has been trained to respond to the letter C, but the first through fourth simulated neurons 1701-1704 have not changed. That is, first simulated neuron 1701 is still trained to respond to the letter A; second simulated neuron 1702 is still trained to respond to the letter B; and third simulated neuron 1703 and fourth simulated neuron 1704 remain untrained. To ensure that three simulated neurons are available to be trained, a sixth simulated neuron 1706 has been added to modified memory array 1700'. In this way, even though fifth simulated neuron 1705 has been trained to respond to a specific stimulus (e.g., the letter C), modified memory array 1700' still includes three untrained simulated neurons that may be trained during the neural simulation—namely, third simulated neuron 1703, fourth simulated neuron 1704, and newly created simulated neuron 1706.

It is to be appreciated that the memory arrays of FIG. 17 are presented for illustrative purposes only, and not limitation. For example, while the memory arrays of FIG. 17 include specific numbers of simulated neurons, a memory array in accordance with an embodiment of the present invention may include greater or fewer numbers of simulated neurons.

FIG. 25 provides an example flow chart 2500, illustrating functionality of a creation-type anatomy in accordance with an embodiment of the present invention. Flow chart 2500 begins at a step 2502 in which the activity and phase of simulated neurons is updated. For example, the activity and phase of simulated neurons 1701 through 1705 may be updated. In an embodiment, the activity and phase of the simulated neurons is updated by data-parallel processing unit(s) 1308 of system 1300 and then provided to general-purpose computer 1304.

In a step 2504, the simulated neurons are checked to determine if there are any free simulated neurons—i.e., a simulated neuron that is not trained to respond to a specific stimuli. A simulated neuron may be determined to be free, for example, if it has not been active during a predetermined number of previous simulation cycles. However, other methods for determining whether a simulated neuron is free may be used without deviating from the spirit and scope of the present invention. In the example of FIG. 17A, simulated neurons 1703, 1704, and 1705 are determined to be free. In an embodiment, general-purpose computer 1304 may read results provided by data-parallel processing unit(s) 1308 to determine the number of free simulated neurons. In another embodiment, data-parallel processing unit(s) 1308 may determine the number of free simulated neurons and provide this information to general-purpose computer 1304. In either embodiment, the number of free simulated neurons may be displayed on remote device 1306.

In a step 2506, it is determined whether the number of free simulated neurons is below a threshold (e.g., three free simulated neurons as in the example of FIG. 17). If in step 2506 it is determined that the number of free neurons is not below the threshold, then control flows back to step 2502.

If, on the other hand, it is determined that the number of free neurons is below the threshold (e.g., three free simulated neurons as in the example of FIG. 17), then one or more simulated neurons is created. The number of free neurons created depends on how far below the threshold the number of free neurons has fallen. For example, in FIG. 17B, only one simulated neuron was newly trained (e.g., simulated neuron 1705), so only one simulated neuron was created (e.g., simulated neuron 1706). If two simulated neurons were newly trained, then two new simulated neurons would have been created; if three simulated neurons were newly trained, then three new simulated neurons would have been created; and so on.

In an embodiment, data-parallel processing unit(s) 1308 implements steps 2506 and/or 2508. In an embodiment, general-purpose computer 1304 implements steps 2506 and/or 2508.

C. Destruction-Type Dynamic Anatomy

FIGS. 18A and 18B collectively illustrate an example dynamic anatomy in which a simulated neuron is destroyed (killed) in accordance with an embodiment of the present invention.

Referring to FIG. 18A, a memory array 1800 comprises a plurality of simulated neurons—including a first simulated neuron 1801, a second simulated neuron 1802, a third simulated neuron 1803, a fourth simulated neuron 1804, and a fifth simulated neuron 1805. In the example of FIG. 18A, memory array 1800 includes three simulated neurons that have been trained. Specifically, first simulated neuron 1801 has been trained to respond to the letter A; second simulated neuron 1802 has been trained to respond to the letter B; and third simulated neuron 1803 has been to respond to the letter C. Memory array 1800 also includes two simulated neurons that have not been trained—namely, fourth simulated neuron 1804 and fifth simulated neuron 1805.

During a neural simulation, the stimuli that causes a trained simulated neuron to become active may not be received for several simulation cycles. For example, the letter C may not be included in an input signal for several simulation cycles and, as a result, third simulated neuron 1803 may not be activated during those simulation cycles.

Simulated neurons that have not been activated for a predetermined number of simulation cycles may be freed, so that these simulated neurons may be retrained to respond to a different stimulus. For example, FIG. 18B illustrates a modified memory array 1800' in which third simulated neuron 1803 has been freed. In this way, third simulated neuron 1803 may be retrained to respond to a different stimulus (e.g., the letter D).

By freeing simulated neuron 1803, memory array 1800' would have three free simulated neurons—namely, simulated neurons 1803, 1804, and 1805—if simulated neurons could not be destroyed. Keeping a large number of free simulated neurons requires additional memory resources (to store information of the free simulated neurons) and additional processing resources (to update information of the free simulated neurons). To address this issue, an embodiment of the present invention is configured to maintain a consistent number of free simulated neurons by killing (e.g., de-allocating) simulated neurons if the number of free simulated neurons exceeds a threshold. The example of FIG. 18 includes two free simulated neurons. To maintain two free simulated neurons in the example of FIG. 18, simulated neuron 1805 is killed. In this way, memory array 1800' of FIG. 18B—like memory array 1800 of FIG. 18A—has only two free simulated neurons. It is to be appreciated, however, that an embodiment of the present invention may maintain a greater or lesser number of free simulated neurons. The example of two free simulated neurons, as in FIG. 18, is presented for illustrative purposes only, and not limitation.

It is to be appreciated that the memory arrays of FIG. 18 are presented for illustrative purposes only, and not limitation. For example, while the memory arrays of FIG. 18 include specific numbers of simulated neurons, a memory array in accordance with an embodiment of the present invention may include greater or fewer numbers of simulated neurons.

FIG. 26 provides an example flow chart 2600, illustrating functionality of a destruction-type anatomy in accordance with an embodiment of the present invention. Flow chart 2600 begins at a step 2602 in which the activity and phase of simulated neurons is updated. For example, the activity and phase of simulated neurons 1801 through 1805 may be updated. In an embodiment, the activity and phase of the simulated neurons is updated by data-parallel processing unit(s) 1308 of system 1300 and then provided to general-purpose computer 1304.

In a step 2604, the simulated neurons are checked to determine if there are any free simulated neurons—i.e., a simulated neuron that is not trained to respond to a specific stimuli. A simulated neuron may be determined to be free, for example, if it has not been active during a predetermined number of previous simulation cycles. However, other methods for determining whether a simulated neuron is free may be used without deviating from the spirit and scope of the present invention. In the example of FIG. 18A, simulated neurons 1804 and 1805 are determined to be free. In an embodiment, general-purpose computer 1304 may read results provided by data-parallel processing unit(s) 1308 to determine the number of free simulated neurons. In another embodiment, data-parallel processing unit(s) 1308 may compute this information and provide it to general-purpose computer 1304. In either embodiment, the number of free simulated neurons may be displayed on remote device 1306.

In a step 2606, it is determined whether the number of free simulated neurons is above a threshold (e.g., two free simulated neurons as in the example of FIG. 18). If in step 2606 it is determined that the number of free neurons is not above the threshold, then control flows to step 2602.

If, on the other hand, it is determined that the number of free neurons is above the threshold, then one or more simulated neurons is destroyed. The number of free neurons destroyed depends on how far above the threshold the number of free neurons has risen, such that the number of free neurons is maintained at a predefined number (e.g., two free simulated neurons as in FIG. 18). In FIG. 18B, only one simulated neuron was newly freed (e.g., simulated neuron 1803), so only one free simulated neuron was destroyed (e.g., simulated neuron 1805). It is to be appreciated, however, that the use of two free simulated neurons, as in FIG. 18, is for illustrative purposes only, and not limitation. A person skilled in the relevant art(s) will appreciate that a brain-based device may maintain a different number of free simulated neurons without deviating from the spirit and scope of the present invention.

In an embodiment, data-parallel processing unit(s) 1308 implements steps 2606 and/or 2608. In an embodiment, general-purpose computer 1304 implements steps 2606 and/or 2608.

VIII. Example Computer System and Software Implementation

Various aspects of the present invention—such as brain-based devices and neural simulations executed by the brain-based devices—can be implemented by software, firmware, hardware, or a combination thereof. FIG. 19 illustrates an example computer system 1900 in which an embodiment of the present invention, or portions thereof, can be implemented as computer-readable code. Various embodiments of the invention are described in terms of this example computer system 1900. After reading this description, it will become apparent to a person skilled in the relevant art how to implement the invention using other computer systems and/or computer architectures.

Computer system 1900 includes one or more processors, such as processor 1904. Processor 1904 can be a special purpose or a general purpose processor. For example 1904 may comprise a processing unit included in general-purpose computer 1304 or may comprise data-parallel processing unit 1308. Processor 1904 is connected to a communication infrastructure 1906 (for example, a bus or network).

Computer system 1900 includes a display interface 1902. Display interface 1902 is coupled to a display device 1930 (such as, a liquid-crystal display, a cathode-ray tube display, a plasma screen display, or some other type of display).

Computer system 1900 also includes a main memory 1908, preferably random access memory (RAM), and may also include a secondary memory 1910. Secondary memory 1910 may be substantially similar to secondary memory 1310. Secondary memory 1910 may include, for example, a hard disk drive 1912 and/or a removable storage drive 1914.

Removable storage drive 1914 may comprise a floppy disk drive, a magnetic tape drive, an optical disk drive, a flash memory, or the like. The removable storage drive 1914 reads from and/or writes to a removable storage unit 1918 in a well known manner. Removable storage unit 1918 may comprise a floppy disk, magnetic tape, optical disk, etc. which is read by and written to by removable storage drive 1914. As will be appreciated by persons skilled in the relevant art(s), removable storage unit 1918 includes a computer usable storage medium having stored therein computer software and/or data.

In alternative implementations, secondary memory 1910 may include other similar means for allowing computer programs or other instructions to be loaded into computer system 1900. Such means may include, for example, a removable storage unit 1922 and an interface 1920. Examples of such means may include a program cartridge and cartridge interface (such as that found in video game devices), a removable memory chip (such as an EPROM, or PROM) and associated socket, and other removable storage units 1922 and interfaces 1920 which allow software and data to be transferred from the removable storage unit 1922 to computer system 1900.

Computer system 1900 may also include a communications interface 1924. Communications interface 1924 allows software and data to be transferred between computer system 1900 and external devices. Communications interface 1924 may include a modem, a network interface (e.g., an Ethernet card), a communications port, a PCMCIA slot and card, or the like. Software and data transferred via communications interface 1924 are in the form of signals 1928 which may be electronic, electromagnetic, optical, or other signals capable of being received by communications interface 1924. These signals 1928 are provided to communications interface 1924 via a communications path 1926. Communications path 1926 carries signals 1928 and may be implemented using wire or cable, fiber optics, a phone line, a cellular phone link, an RF link or other communications channels.

In this document, the terms "computer program medium" and "computer usable medium" are used to generally refer to media such as removable storage unit 1918, removable storage unit 1922, a hard disk installed in hard disk drive 1912, and signals 1928. Computer program medium and computer usable medium can also refer to memories, such as main memory 1908 and secondary memory 1910, which can be memory semiconductors (e.g. DRAMs, etc.). These computer program products are means for providing software to computer system 1900.

Computer programs (also called computer control logic) are stored in main memory 1908 and/or secondary memory 1910. Computer programs may also be received via communications interface 1924. Such computer programs, when executed, enable computer system 1900 to implement embodiments of the present invention as discussed herein, such as neural simulations as described above. Accordingly, such computer programs represent controllers of the computer system 1900. Where embodiments of the invention are implemented using software, the software may be stored in a computer program product and loaded into computer system 1900 using removable storage drive 1914, interface 1920, hard drive 1912 or communications interface 1924.

IX. Conclusion

Described above are brain-based devices that are configured to segment content of an input signal and applications thereof. It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A method for processing an input signal using a plurality of simulated neurons, wherein each simulated neuron is connected to one or more other simulated neurons, and each simulated neuron is associated with an activity and a phase, the method comprising:
    (a) setting activity and phase of each simulated neuron based on activity and phase of other simulated neurons connected to said each simulated neuron;
    (b) modulating activity and phase of each of the plurality of simulated neurons based on a plurality of modulation functions; and
    (c) identifying one or more distinct entities in the input signal based on one or more distinct collections of simulated neurons that have substantially distinct phases.

2. The method of claim 1, further comprising:
    establishing connections between simulated neurons based on definitions provided in a network-description file.

3. The method of claim 1, wherein step (c) comprises:
    using a histogram to identify the one or more distinct entities in the input signal.

4. The method of claim 1, wherein step (c) comprises:
    using a selection-cell anatomy to identify the one or more distinct entities in the input signal.

5. The method of claim 1, wherein the input signal comprises a video signal, and wherein step (c) comprises:
    identifying a first object in the video signal based on a first collection of simulated neurons having substantially a first phase; and
    identifying a second object in the video signal based on a second collection of simulated neurons having substantially a second phase.

6. The method of claim 1, wherein the input signal comprises an audio signal, and wherein step (c) comprises:
    identifying a first sound source in the audio signal based on a first collection of simulated neurons having substantially a first phase; and
    identifying a second sound source in the audio signal based on a second collection of simulated neurons having substantially a second phase.

7. The method of claim 6, wherein:
    the first sound source comprises a first human speaker; and
    the second sound source comprises a second human speaker.

8. A computer-program product comprising a computer-readable storage medium having instructions stored thereon that, if executed by a computing device, cause the computing device to perform a method for processing an input signal using a plurality of simulated neurons, wherein each simulated neuron is connected to one or more other simulated neurons, and each simulated neuron is associated with an activity and a phase, the method comprising:
    (a) setting activity and phase of each simulated neuron based on activity and phase of other simulated neurons connected to said each simulated neuron;
    (b) modulating activity and phase of each of the plurality of simulated neurons based on a plurality of modulation functions; and
    (c) identifying one or more distinct entities in the input signal based on one or more distinct collections of simulated neurons that have substantially distinct phases.

9. The computer-program product of claim 8, wherein the method further comprises:
    establishing connections between simulated neurons based on definitions provided in a network-description file.

10. The computer-program product of claim 8, wherein step (c) of the method comprises:
using a histogram to identify the one or more distinct entities in the input signal.

11. The computer-program product of claim 8, wherein step (c) of the method comprises:
using a selection-cell anatomy to identify the one or more distinct entities in the input signal.

12. The computer-program product of claim 8, wherein the input signal comprises a video signal, and wherein step (c) of the method comprises:
identifying a first object in the video signal based on a first collection of simulated neurons having substantially a first phase; and
identifying a second object in the video signal based on a second collection of simulated neurons having substantially a second phase.

13. The computer-program product of claim 8, wherein the input signal comprises an audio signal, and wherein step (c) of the method comprises:
identifying a first sound source in the audio signal based on a first collection of simulated neurons having substantially a first phase; and
identifying a second sound source in the audio signal based on a second collection of simulated neurons having substantially a second phase.

14. The computer-program product of claim 13, wherein:
the first sound source comprises a first human speaker; and
the second sound source comprises a second human speaker.

15. A system for processing an input signal, comprising:
a plurality of simulated neurons, each simulated neuron connected to one or more other simulated neurons, and each simulated neuron associated with an activity and a phase, wherein activity and phase of each simulated neuron are configured to be set based on activity and phase of other simulated neurons connected to said each simulated neuron; and
a phase modulator comprising a plurality of individual modulators, each individual modulator configured to modulate activity and phase of each of the plurality of simulated neurons based on a modulation function;
an entity-identifier module configured to identify one or more distinct entities in the input signal based on one or more distinct collections of simulated neurons that have substantially distinct phases.

16. The system of claim 15, further comprising:
a network-description file that defines how a simulated neuron is to be connected to the one or more other simulated neurons.

17. The system of claim 15, wherein entity-identifier module is configured to use a histogram to identify the one or more distinct entities in the input signal.

18. The system of claim 15, wherein entity-identifier module comprises:
a selection-cell anatomy configured to identify the one or more distinct entities in the input signal.

19. The system of claim 15, wherein:
the input signal comprises a video signal; and
the entity-identifier module is configured to identify (i) a first object in the video signal based on a first collection of simulated neurons having substantially a first phase and (ii) a second object in the video signal based on a second collection of simulated neurons having substantially a second phase.

20. The system of claim 15, wherein:
the input signal comprises an audio signal; and
the entity-identifier module is configure to identify (i) a first sound source in the audio signal based on a first collection of simulated neurons having substantially a first phase and (ii) a second sound source in the audio signal based on a second collection of simulated neurons having substantially a second phase.

21. The system of claim 20, wherein:
the first sound source comprises a first human speaker; and
the second sound source comprises a second human speaker.

* * * * *